United States Patent
Eguchi

(10) Patent No.: US 7,738,182 B2
(45) Date of Patent: Jun. 15, 2010

(54) IMAGE PICKUP OPTICAL SYSTEM AND IMAGE PICKUP APPARATUS INCLUDING THE SAME

(75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/388,865

(22) Filed: Feb. 19, 2009

(65) Prior Publication Data

US 2009/0213472 A1      Aug. 27, 2009

(30) Foreign Application Priority Data

Feb. 25, 2008   (JP)   ............................. 2008-042755

(51) Int. Cl.
*G02B 15/14* (2006.01)
*G02B 9/00* (2006.01)

(52) U.S. Cl. ........................ 359/676; 359/680; 359/691; 359/737; 359/793

(58) Field of Classification Search ................. 359/676, 359/680–682, 684, 686, 689, 691, 737, 754–757, 359/761, 763, 770, 771, 781–784, 793; 369/112.01–112.29
See application file for complete search history.

(56) References Cited

U.S. PATENT DOCUMENTS 6,496,310 B2 * 12/2002 Fujimoto .................... 359/680

FOREIGN PATENT DOCUMENTS

| JP | 09-033801 A | 2/1997 |
|---|---|---|
| JP | 2000-147373 A | 5/2000 |
| JP | 2001-159732 A | 6/2001 |
| JP | 2001-166206 A | 6/2001 |
| JP | 2005-084971 A | 3/2005 |

* cited by examiner

*Primary Examiner*—Darryl J Collins
(74) *Attorney, Agent, or Firm*—Canon U.S.A., Inc. I.P. Division

(57) ABSTRACT

An image pickup optical system includes a first-lens unit having negative refractive power; a second-lens unit having positive refractive power and being disposed closer to an image side than the first-lens unit; an aperture; and a diffraction optical part provided on the joint surface of a first-cemented lens closer to the image side than the aperture. The focal length of the whole system, the Abbe number of the negative lens of a second-cemented lens closer to the image side than the aperture, the focal length within the air, the Abbe number of a negative lens closer to an object side than the aperture, the average value between the curvature radius closest to the object side and the curvature radius closest to the image side of the first-cemented lens including the diffraction optical part, the curvature radius of the diffraction optical part, and so forth, are set appropriately.

10 Claims, 17 Drawing Sheets

IMAGE PICKUP OPTICAL SYSTEM AND IMAGE PICKUP APPARATUS INCLUDING THE SAME

BACKGROUND OF THE INVENTION

1. Field of the Invention

The present invention relates to an image pickup optical system, and is suitable for an image pickup apparatus, for example, such as a camera for silver-salt film, digital still camera, video camera, or the like.

2. Description of the Related Art

There has been demand that, of image pickup apparatuses such as digital still cameras, film cameras, and so forth, image pickup optical systems employed for single-lens reflex cameras have long back focus with a wide field angle.

A retrofocus-type image pickup optical system has been known as an image pickup optical system having long back focus with a wide field angle. With this retrofocus-type image pickup optical system, a lens unit having overall negative refractive power is disposed at the object side. Also, a lens unit having overall positive refractive power is disposed at the image side. According to such a lens configuration, an image pickup optical system having long back focus with a wide field angle is realized.

A retrofocus-type lens with single focal length including a first lens unit having negative refractive power and a second lens unit having positive refractive power in order from the object side to the image side has been known as a retrofocus-type image pickup optical system (see Japanese Patent Laid-Open No. 9-33801, U.S. Pat. No. 6,621,645).

Also, a zoom lens including a first lens group having negative refractive power and a second lens group having positive refractive power in order from the object side to the image side has been known as a retrofocus-type image pickup optical system (see Japanese Patent Laid-Open Nos. 2001-166206 and 2005-084971).

In general, with a retrofocus-type zoom lens, the lens configuration is asymmetrical with a wide field angle, and accordingly, chromatic aberration such as chromatic aberration of magnification or the like readily occurs frequently. A retrofocus-type zoom lens wherein the chromatic aberration at this time has been corrected by employing a diffraction optical element has been known (see Japanese Patent Laid-Open Nos. 2000-147373).

Generally, a retrofocus-type image pickup optical system is made up of an asymmetric lens configuration as a whole wherein a lens unit having negative refractive power is disposed at the object side as to the aperture, and a lens unit having positive refractive power is disposed at the image side.

Also, the absolute value of the negative refractive power of the lens unit at the object side is increased so as to ensure long back focus. Therefore, occurrence of various aberrations has been apt to increase.

In particular, with a retrofocus-type image pickup optical system, an off-axis light beam passes through a position relatively distant from the optical axis with a first lens unit having negative refractive power closest to the object side, so of various aberrations, chromatic aberration of magnification readily occurs frequently.

As a method for correcting this chromatic aberration of magnification, there has been frequently employed a method for disposing a positive lens, in which high dispersion glass is employed, in a first lens unit having negative refractive power, and nearby lens units. However, when attempting to correct chromatic aberration of magnification only by this positive lens, chromatic aberration of magnification in a portion having a high image height is excessively corrected. Therefore, with many retrofocus-type image pickup optical systems, in order to balance chromatic aberration of magnification in the whole screen, correction is performed so as to have undercorrection at intermediate image height and have overcorrection at the maximum image height.

On the other hand, employing a diffraction optical element in a part of the image pickup optical system enables correction of chromatic aberration to be readily performed, and an image pickup optical system having high optical performance can be readily obtained. However, even if a diffraction optical element is provided in the lens system, it is difficult to obtain an image pickup optical system having high optical performance whereby chromatic aberration can be appropriately corrected, unless the position and power thereof and the lens configuration of the overall lens system including the diffraction optical element, and so forth, are set appropriately. Also, increasing the power of a diffraction optical part making up the diffraction optical element makes the pitch of the grating portions of diffraction gratings fine.

In order to perform correction of chromatic aberration entirely by the diffraction optical element, there is a need to increase the power of the diffraction optical element. In general, it is very difficult to manufacture with precision diffraction optical elements of which the pitch of the grating portions of the diffraction gratings is fine. Therefore, in the event of correcting chromatic aberration by employing the diffraction optical element, it becomes important to appropriately set the power of the diffraction optical part, the position where the diffraction optical part is provided, the lens configuration, and so forth.

In particular, with a retrofocus-type image pickup optical system, unless these factors are set appropriately, it becomes difficult to suitably correct various aberrations such as chromatic aberration and spherical aberration to obtain high optical performance.

SUMMARY OF THE INVENTION

The present invention provides an image pickup optical system having high optical performance whereby chromatic aberration can be suitably corrected over the entire screen, and an image pickup apparatus including the image pickup optical system thereof.

An image pickup optical system according to an embodiment of the present invention includes a first lens unit having negative refractive power; a second lens unit having positive refractive power and being disposed closer to an image side than the first lens unit, which moves at the time of focusing; and an aperture. The image pickup optical system includes one or more cemented lenses disposed closer to the image side than the aperture, and one or more negative lenses disposed closer to an object side than the aperture; and wherein a diffraction optical part is provided on the joint surface of a first cemented lens of the one or more cemented lenses, and the conditional expressions of $$-0.1 < f/(v_{RN} \times f_{RN}) < -0.02,$$

$$80 < v_{FN} < 97,$$

$$|r_{ave}/r_{DOE}| < 3, \text{ and}$$

$$-0.02 < P_{\theta gF} - (-1.625 \times 10^{-3} \times v_{RP} + 0.642) < 0.03$$

are satisfied in which f represents the focal length of the whole system, $v_{RN}$ and $f_{RN}$ represent the Abbe number of the material of the negative lens of a second cemented lens of the one or more cemented lenses, and the focal length within the air, respectively, $v_{FN}$ represents the maximum Abbe number, of the Abbe number of the material of a negative lens disposed closer to the object side than the aperture, $r_{avr}$ represents the average value between the curvature radius of a face closest to the object side and the curvature radius of a face closest to the image side of the first cemented lens including the diffraction optical part, $r_{DOE}$ represents the curvature radius of the diffraction optical part, $P_{\theta gF}$ represents the partial dispersion ratio of a positive lens having the maximum difference of a partial dispersion ratio as to a reference line of the material of a positive lens disposed closer to the image side than the aperture, and $v_{RP}$ represents the Abbe number of the material of a positive lens having the maximum difference of a partial dispersion ratio as to a reference line of the material of a positive lens disposed closer to the image side than the aperture.

Further features of the present invention will become apparent from the following description of exemplary embodiments with reference to the attached drawings.

DESCRIPTION OF THE EMBODIMENTS

Description will be made below regarding embodiments of an image pickup optical system according to the present invention and an image pickup apparatus including the image pickup optical system. The image pickup optical system according to the present invention is a lens system of single focal length, or zoom lens including a first lens unit having negative refractive power, and a second lens unit having positive refractive poser in order from the object side to the image side.

Of the image optical system according to the present embodiment, with an embodiment of a lens system of single focal length (single focus lens), the second lens unit is a focus lens unit which moves at the time of focusing. Also, of the image optical system according to the present embodiment, with an embodiment of a zoom lens type image optical system (zoom lens), the first lens unit and second lens unit move the mutual interval thereof. One or more lens units are disposed at the image side of the second lens unit as necessary.

Figure 1:
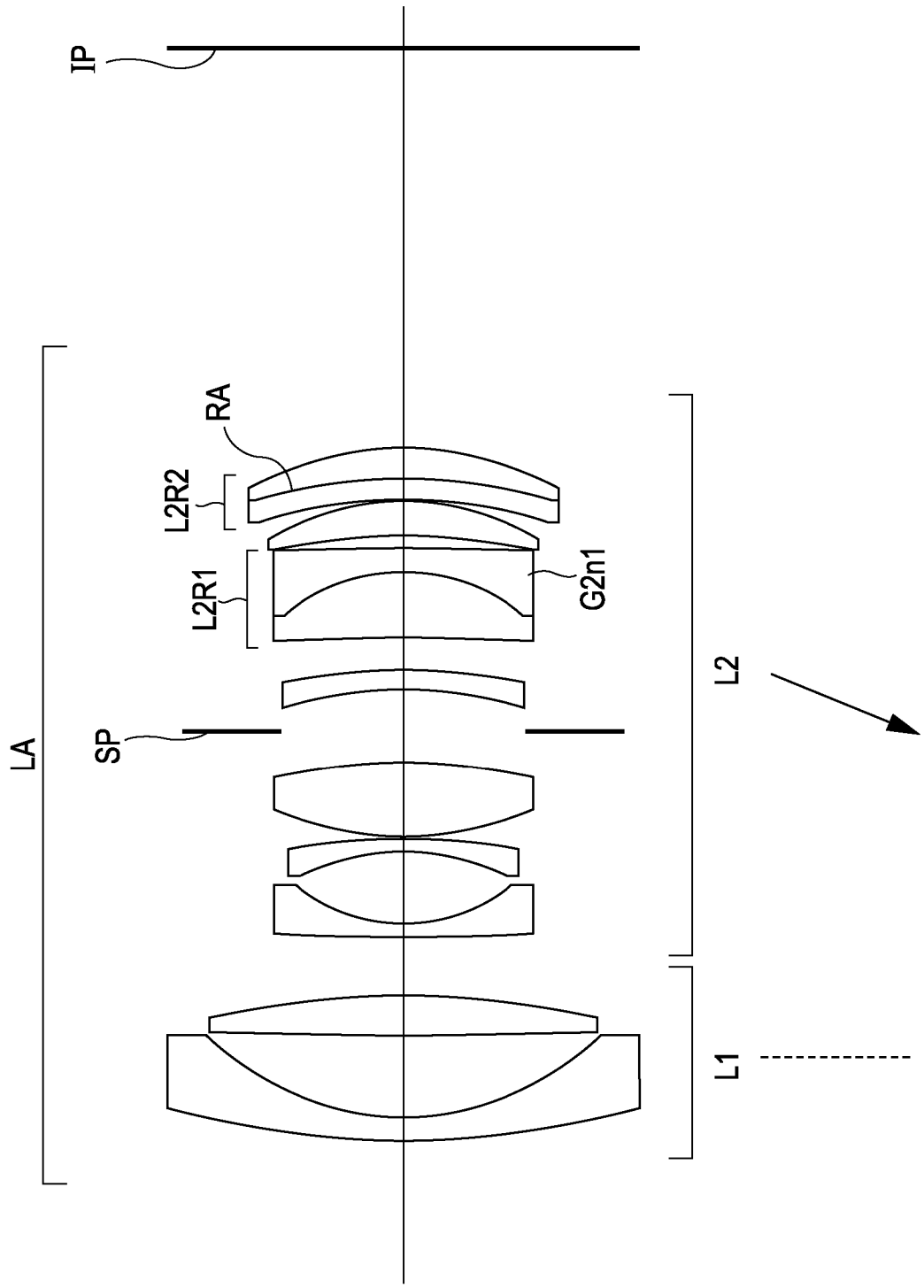
FIG. 1 is a lens cross-sectional view at the time of object distance according to a first numerical embodiment being 1.4 m.
Figure 2:
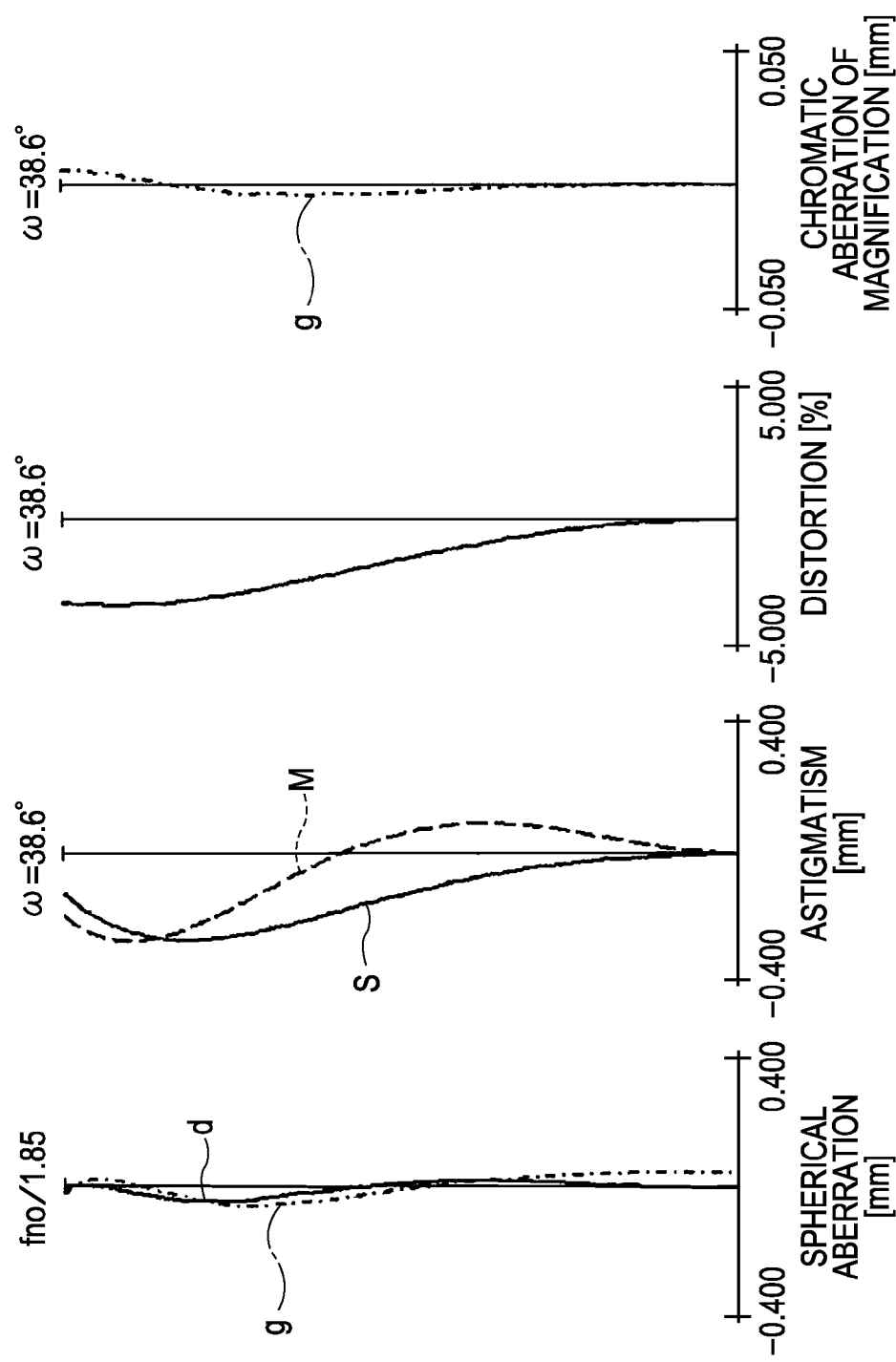
FIG. 2 is a longitudinal-aberration chart at the time of object distance according to the first numerical embodiment being 1.4 m.

FIG. 1 is a lens cross-sectional view of an image pickup optical system according to a first embodiment of the present invention. FIG. 2 is a longitudinal-aberration chart at the time of the object distance of the image pickup optical system according to the first embodiment being 1.4 m (distance from an image plane IP, and the same applies to the following). The first embodiment is a wide-filed angle lens with a half field angle of 38.6°.

Figure 3:
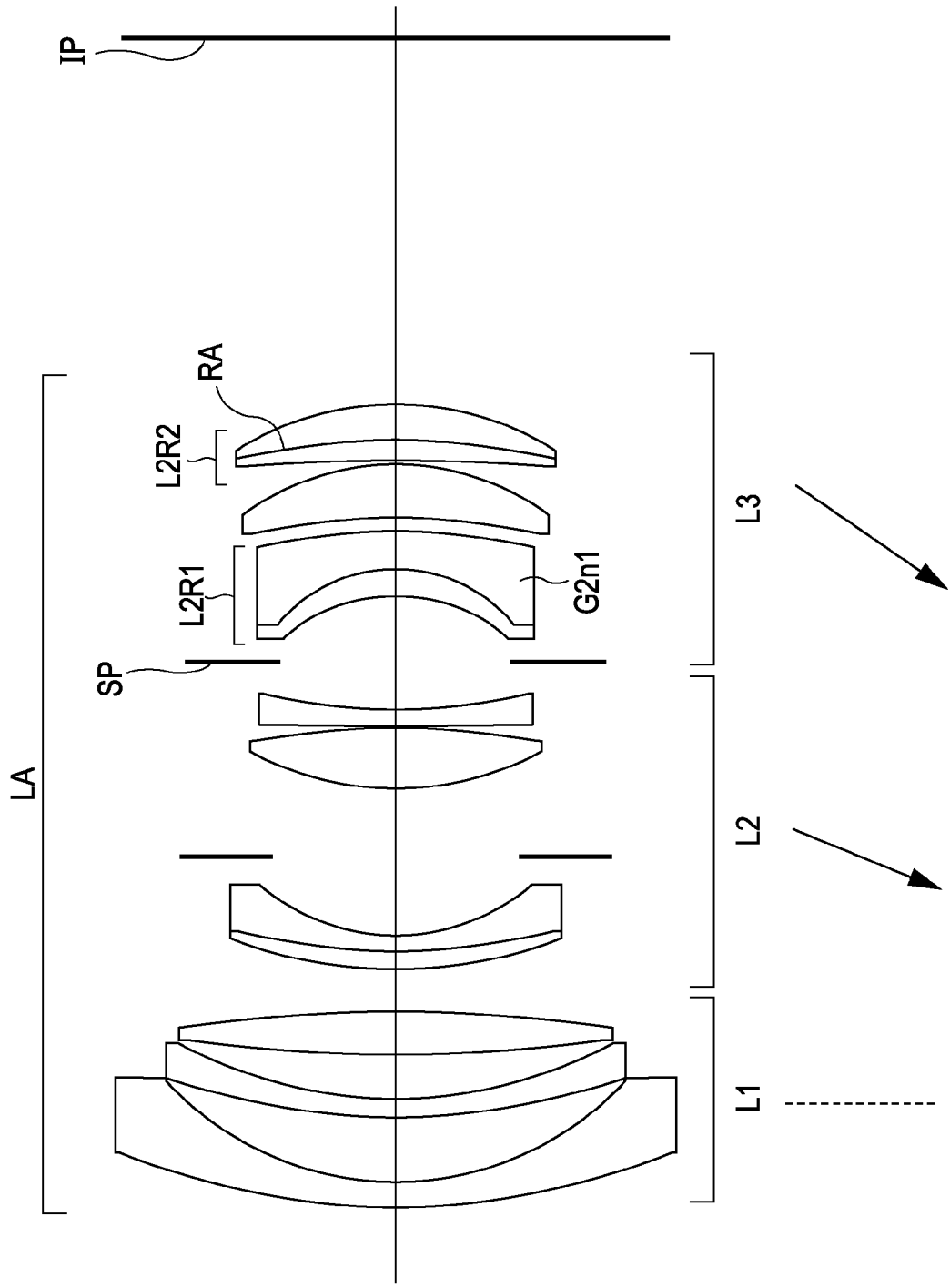
FIG. 3 is a lens cross-sectional view at the time of object distance according to a second numerical embodiment being 1.2 m.
Figure 4:
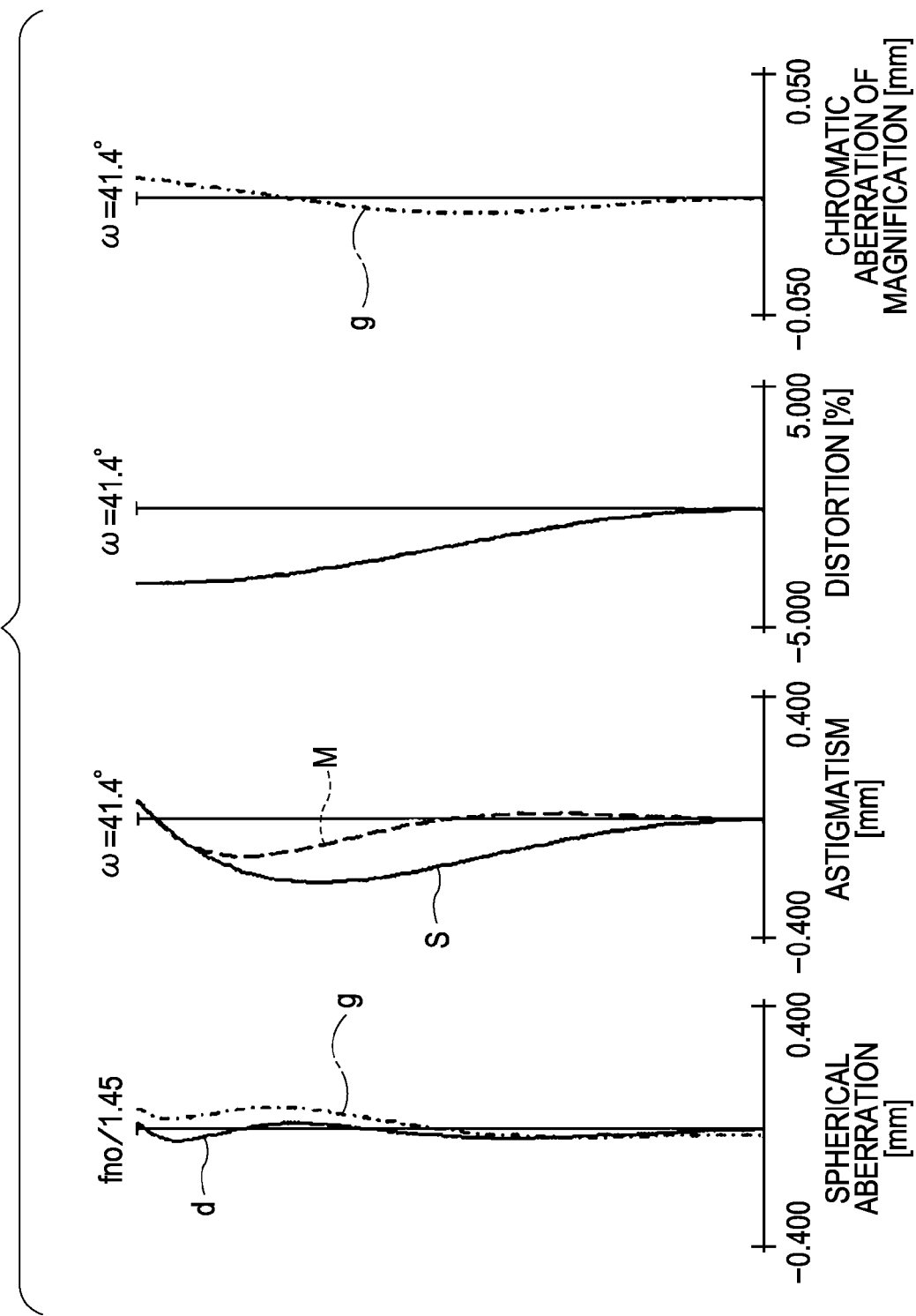
FIG. 4 is a longitudinal-aberration chart at the time of object distance according to the second numerical embodiment being 1.2 m.

FIG. 3 is a lens cross-sectional view of an image pickup optical system according to a second embodiment of the present invention. FIG. 4 is a longitudinal-aberration chart at the time of the object distance of the image pickup optical system according to the second embodiment being 1.2 m. The second embodiment is a wide-filed angle lens with a half field angle of 41.4°.

Figure 5:
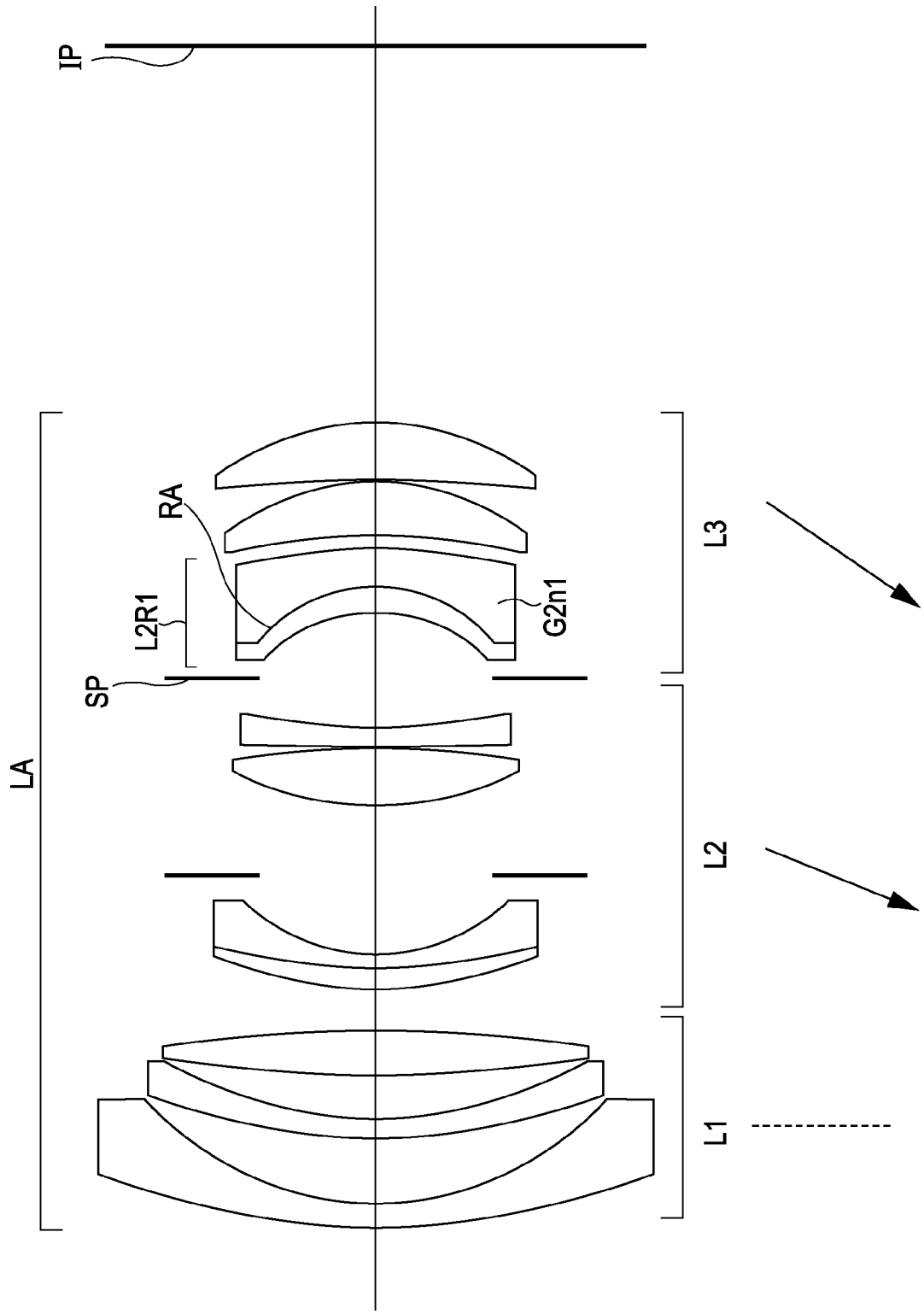
FIG. 5 is a lens cross-sectional view at the time of object distance according to a third numerical embodiment being 1.2 m.
Figure 6:
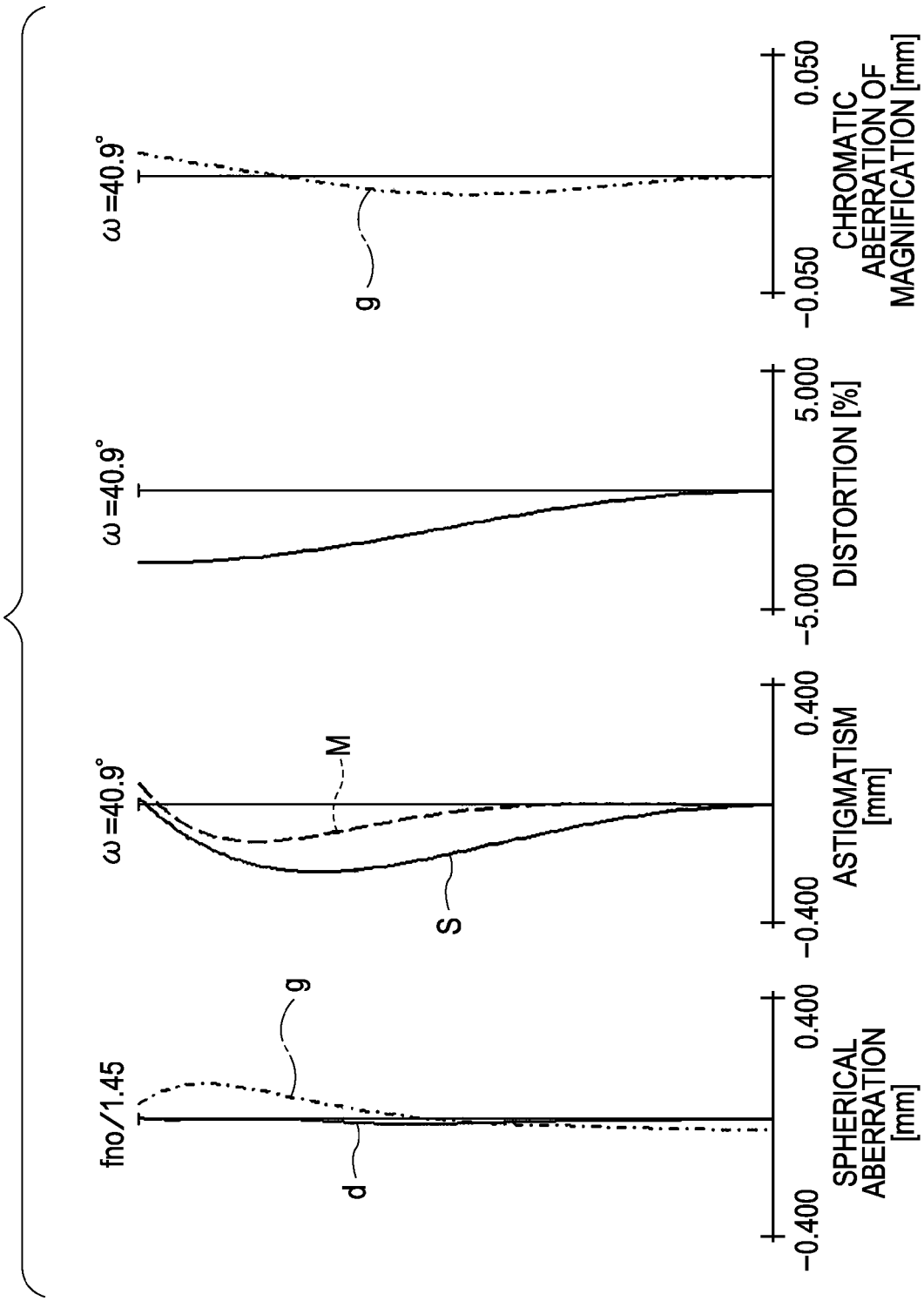
FIG. 6 is a longitudinal-aberration chart at the wide-angle end at the time of object distance according to the third numerical embodiment being 1.2 m.

FIG. 5 is a lens cross-sectional view of an image pickup optical system according to a third embodiment of the present invention. FIG. 6 is a longitudinal-aberration chart at the time of the object distance of the image pickup optical system according to the third embodiment being 1.2 m. The third embodiment is a wide-filed angle lens with a half field angle of 40.9°.

Figure 7:
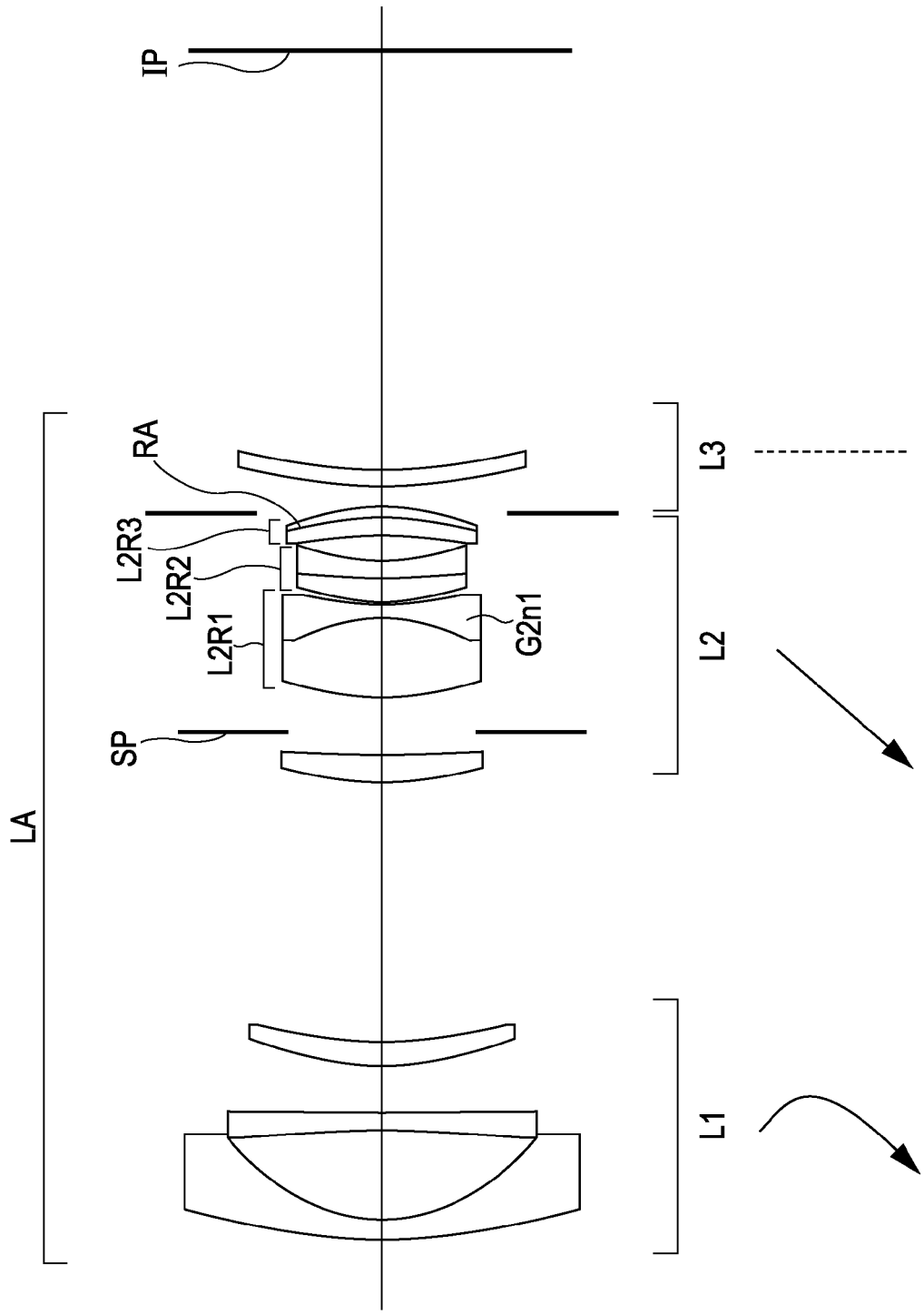
FIG. 7 is a lens cross-sectional view at the time of object distance according to a fourth numerical embodiment being 1.2 m.
Figure 8:
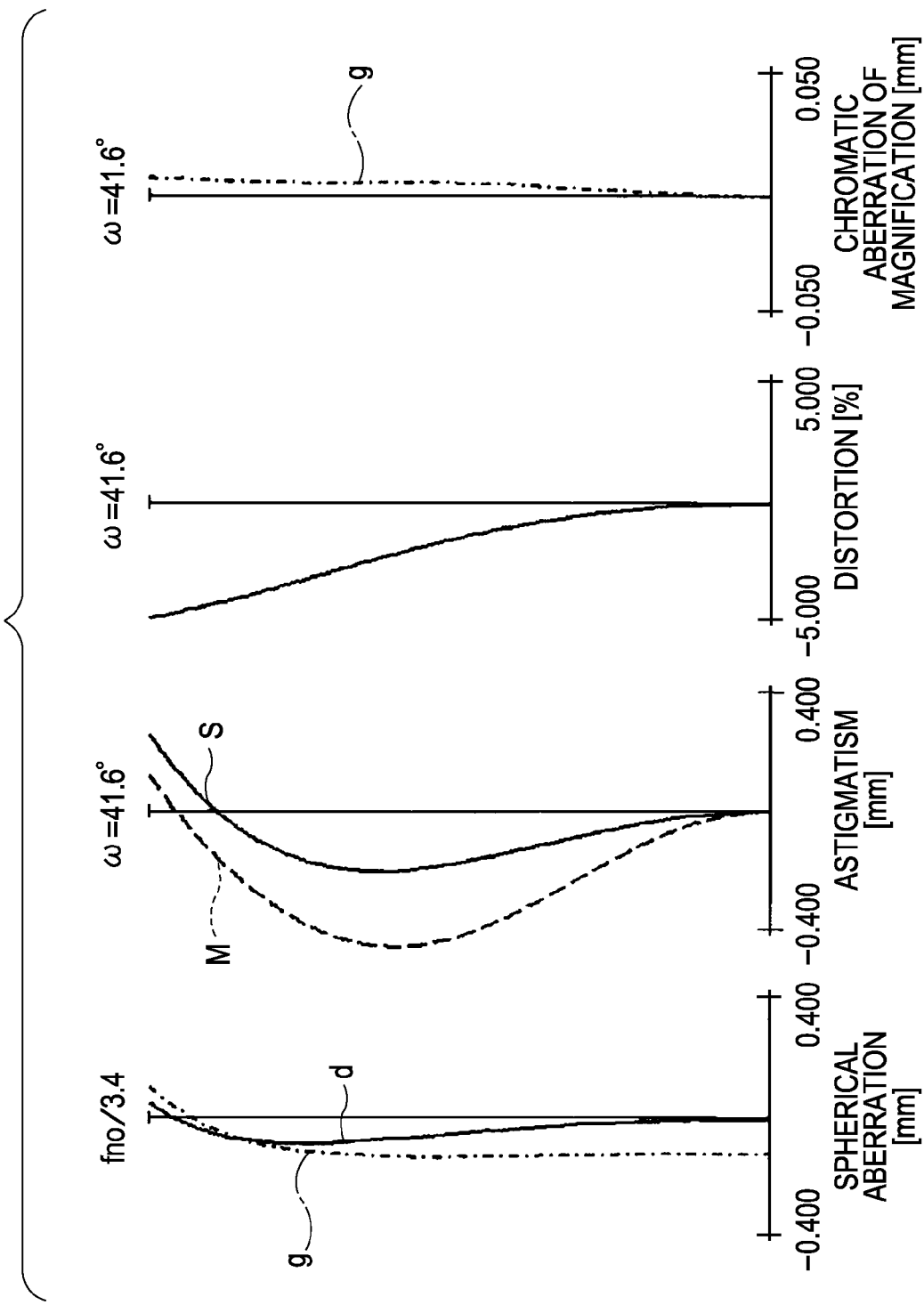
FIG. 8 is a longitudinal-aberration chart at the wide-angle end at the time of object distance according to the fourth numerical embodiment being 1.2 m.
Figure 9:
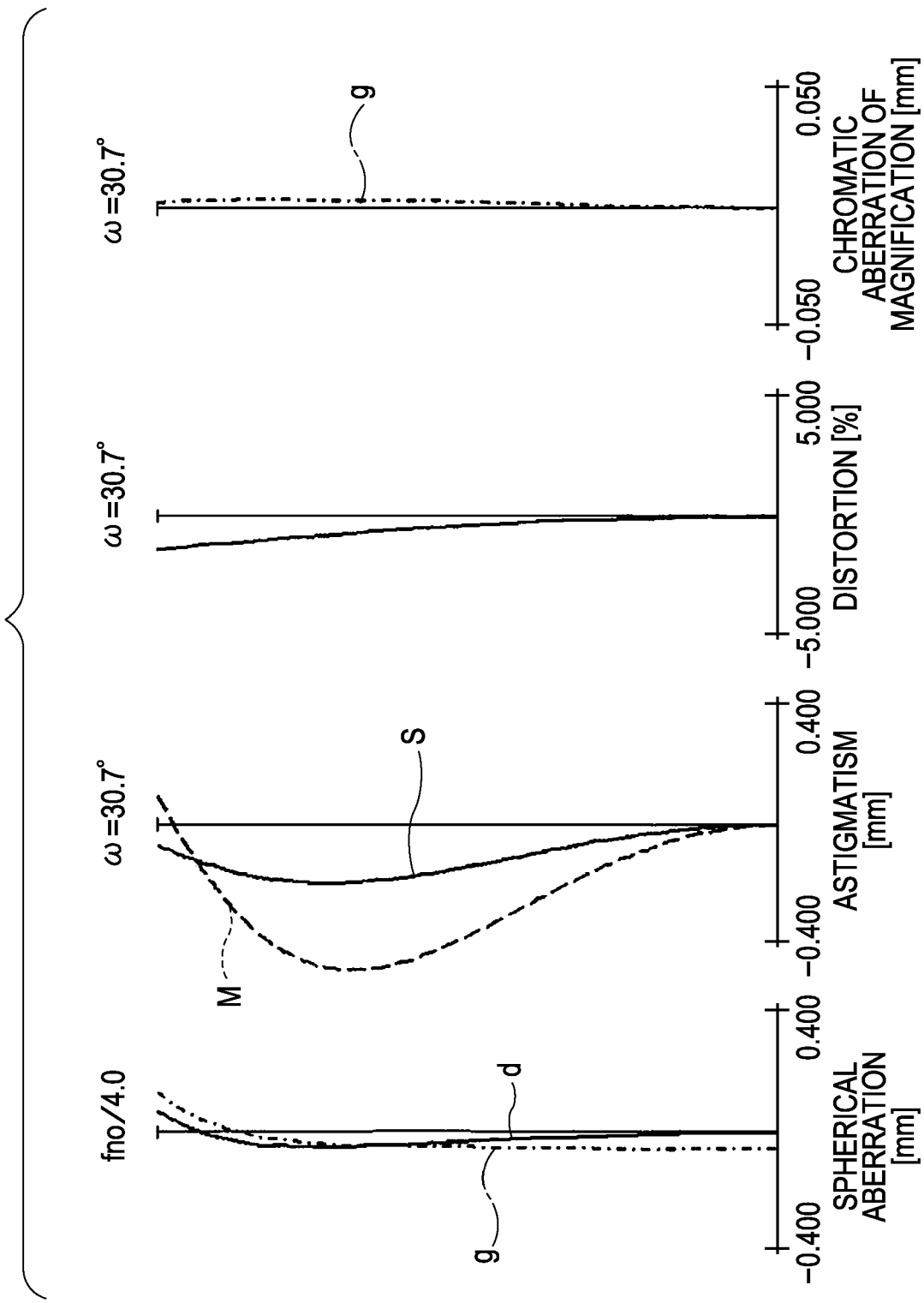
FIG. 9 is a longitudinal-aberration chart at an intermediate zoom position at the time of object distance according to the fourth numerical embodiment being 1.2 m.
Figure 10:
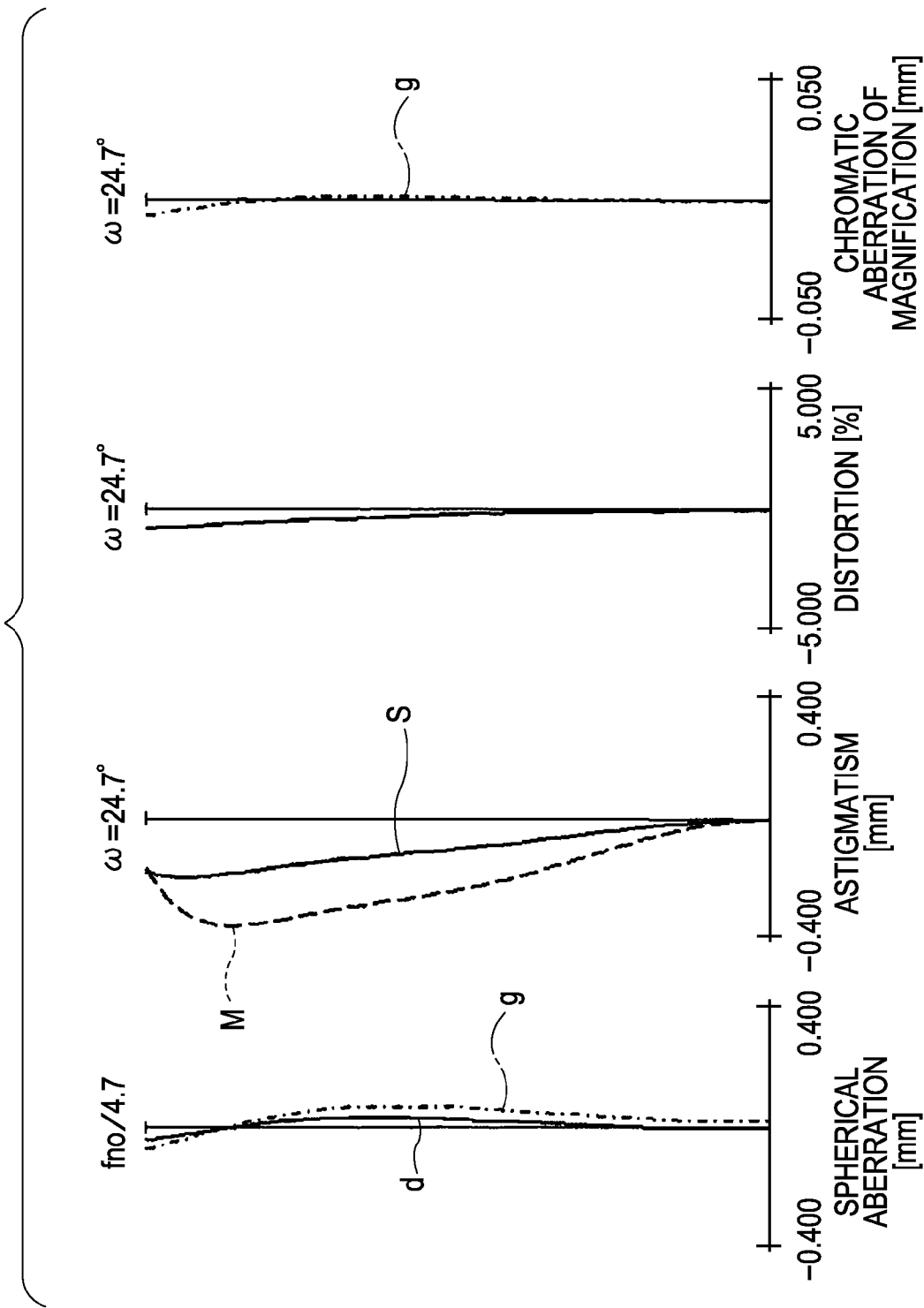
FIG. 10 is a longitudinal-aberration chart at the telephoto end at the time of object distance according to the fourth numerical embodiment being 1.2 m.

FIG. 7 is a lens cross-sectional view at the wide-angle end of an image pickup optical system according to a fourth embodiment of the present invention. FIGS. 8, 9, and 10 are longitudinal-aberration charts at the wide-angle end, intermediate zoom position, and telephoto end when the object distance of the image pickup optical system according to the fourth embodiment is 1.2 m, respectively.

The fourth embodiment is a zoom lens with a half field angle of 41.6° at the wide-angle end, a half field angle of 24.7° at the telephoto end, and a zoom ratio of 1.9.

Figure 11:
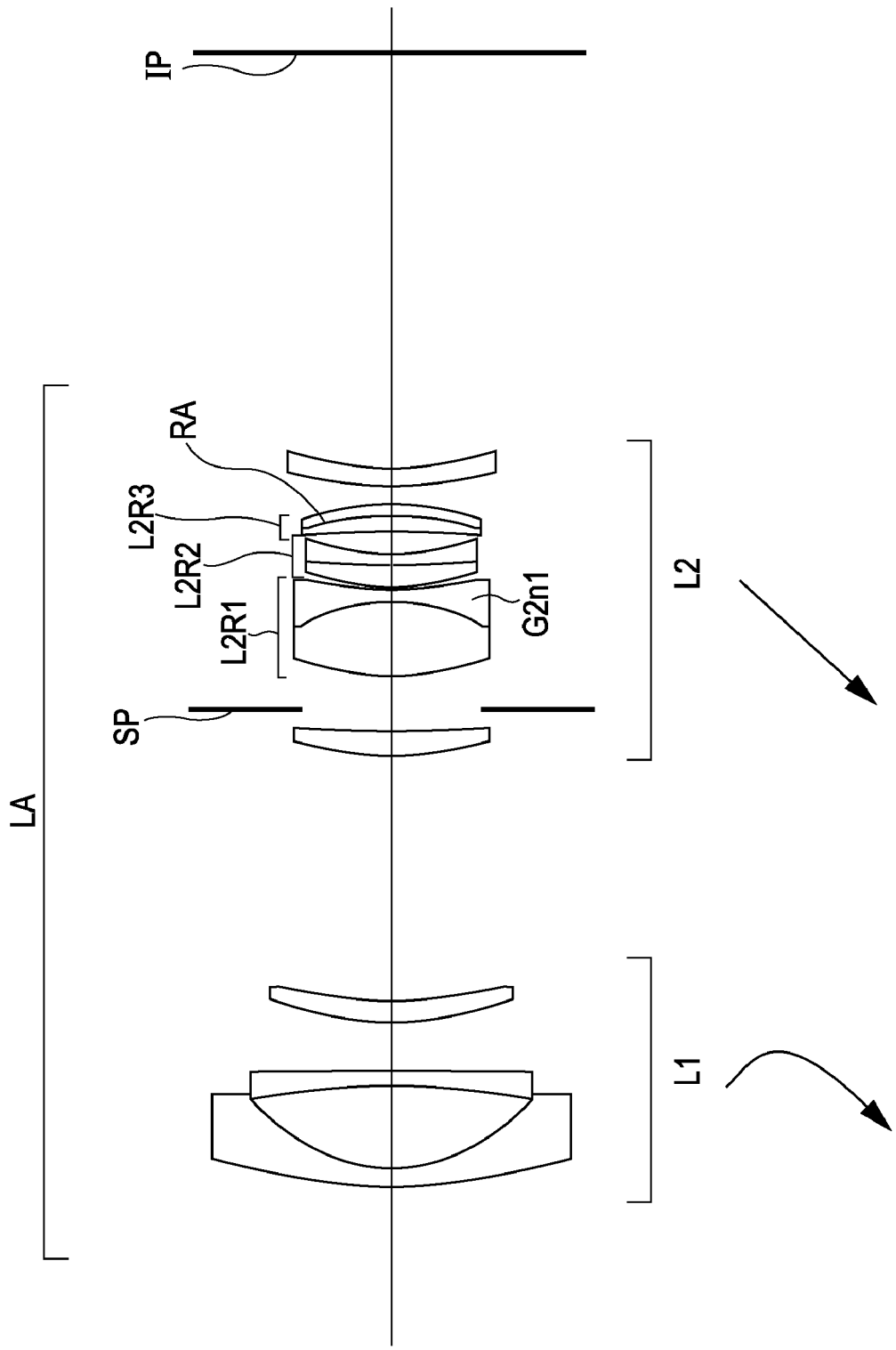
FIG. 11 is a lens cross-sectional view at the time of object distance according to a fifth numerical embodiment being 1.2 m.
Figure 12:
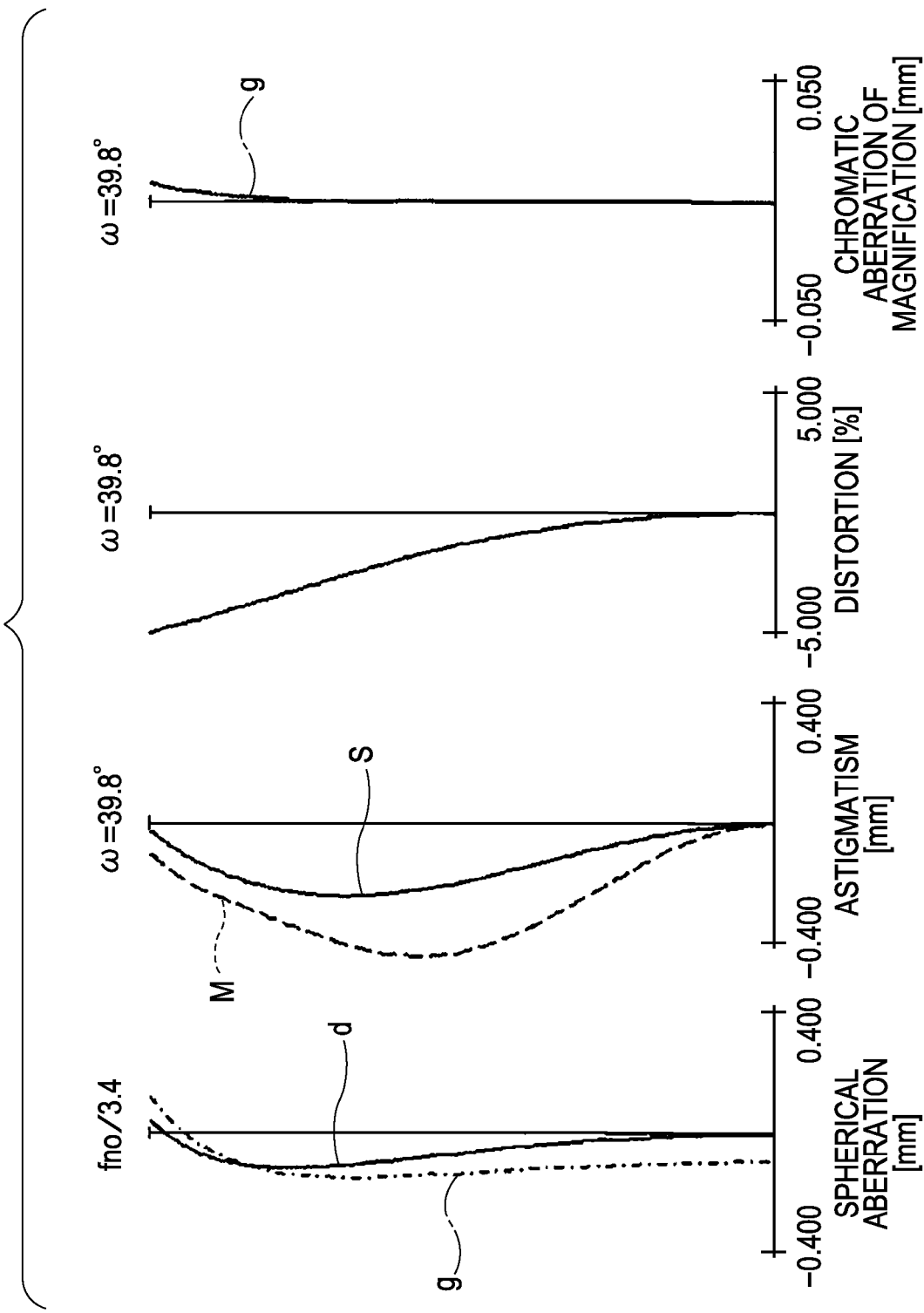
FIG. 12 is a longitudinal-aberration chart at the wide-angle end at the time of object distance according to the fifth numerical embodiment being 1.2 m.
Figure 13:
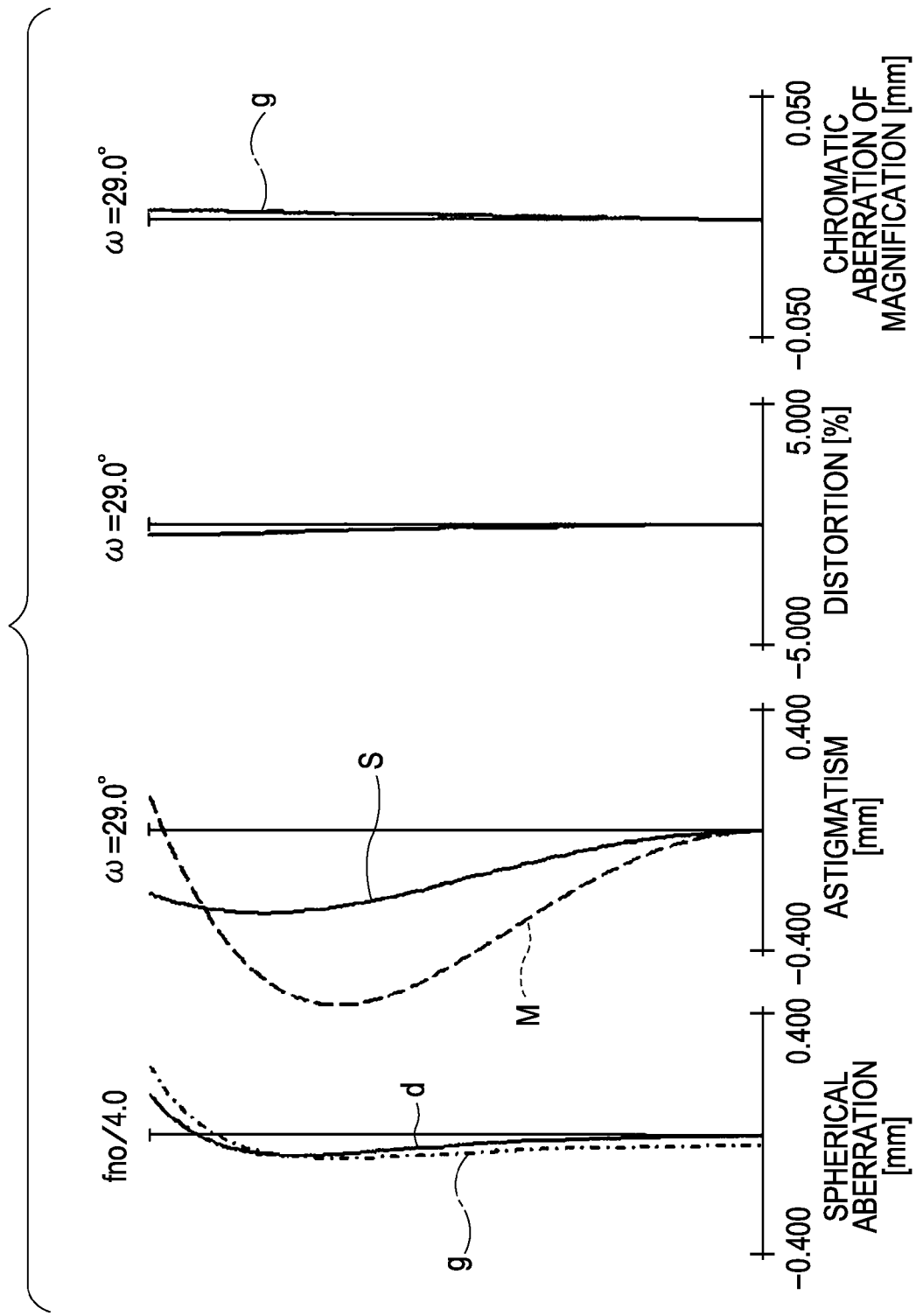
FIG. 13 is a longitudinal-aberration chart at an intermediate zoom position at the time of object distance according to the fifth numerical embodiment being 1.2 m.
Figure 14:
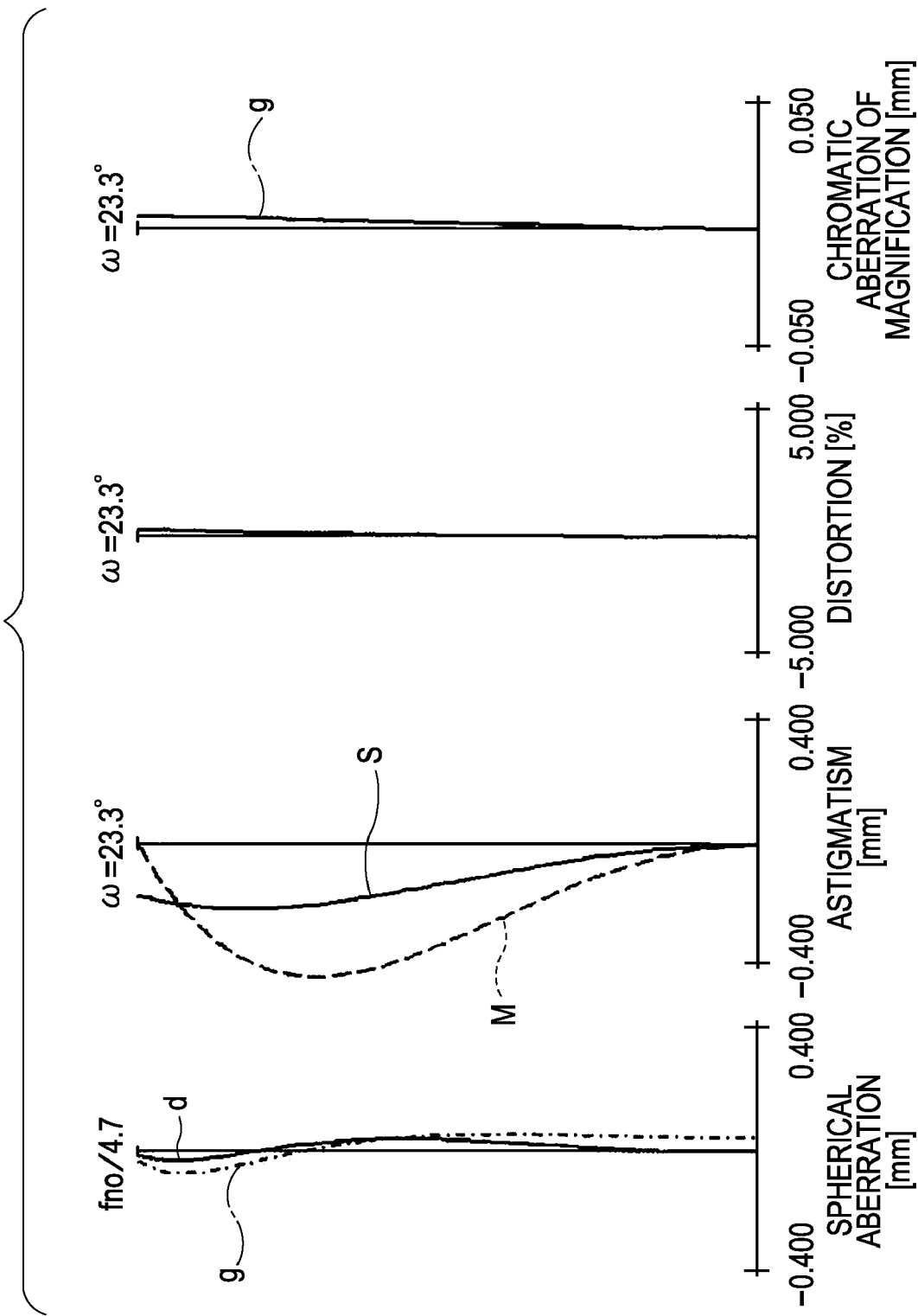
FIG. 14 is a longitudinal-aberration chart at the telephoto end at the time of object distance according to the fifth numerical embodiment being 1.2 m.

FIG. 11 is a lens cross-sectional view at the wide-angle end of an image pickup optical system according to a fifth embodiment of the present invention. FIGS. 12, 13, and 14 are longitudinal-aberration charts at the wide-angle end, intermediate zoom position, and telephoto end when the object distance of the image pickup optical system according to the fifth embodiment is 1.2 m, respectively.

The fifth embodiment is a zoom lens with a half field angle of 39.8° at the wide-angle end, a half field angle of 23.3° at the telephoto end, and a zoom ratio of 1.9.

Figure 15:
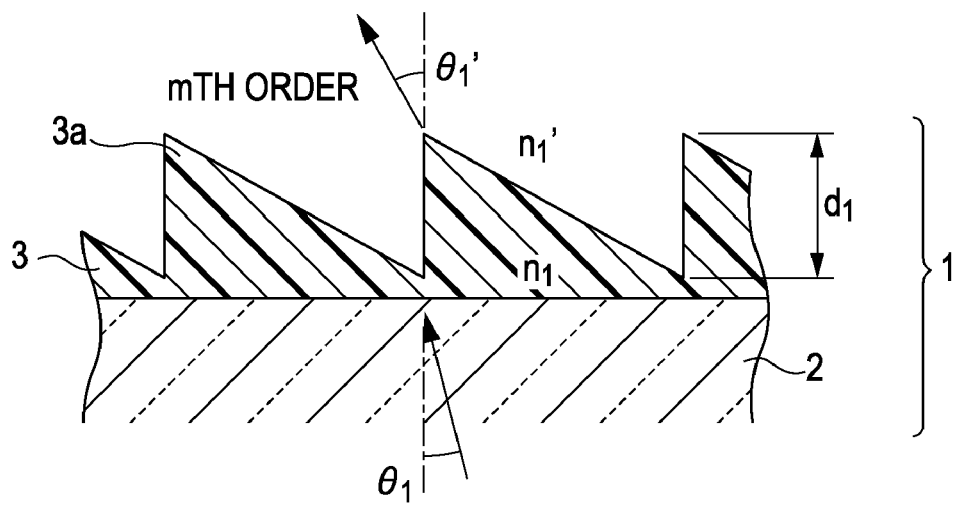
FIG. 15 is a cross-sectional view of a diffraction optical element having a single-layer configuration.
Figure 16:
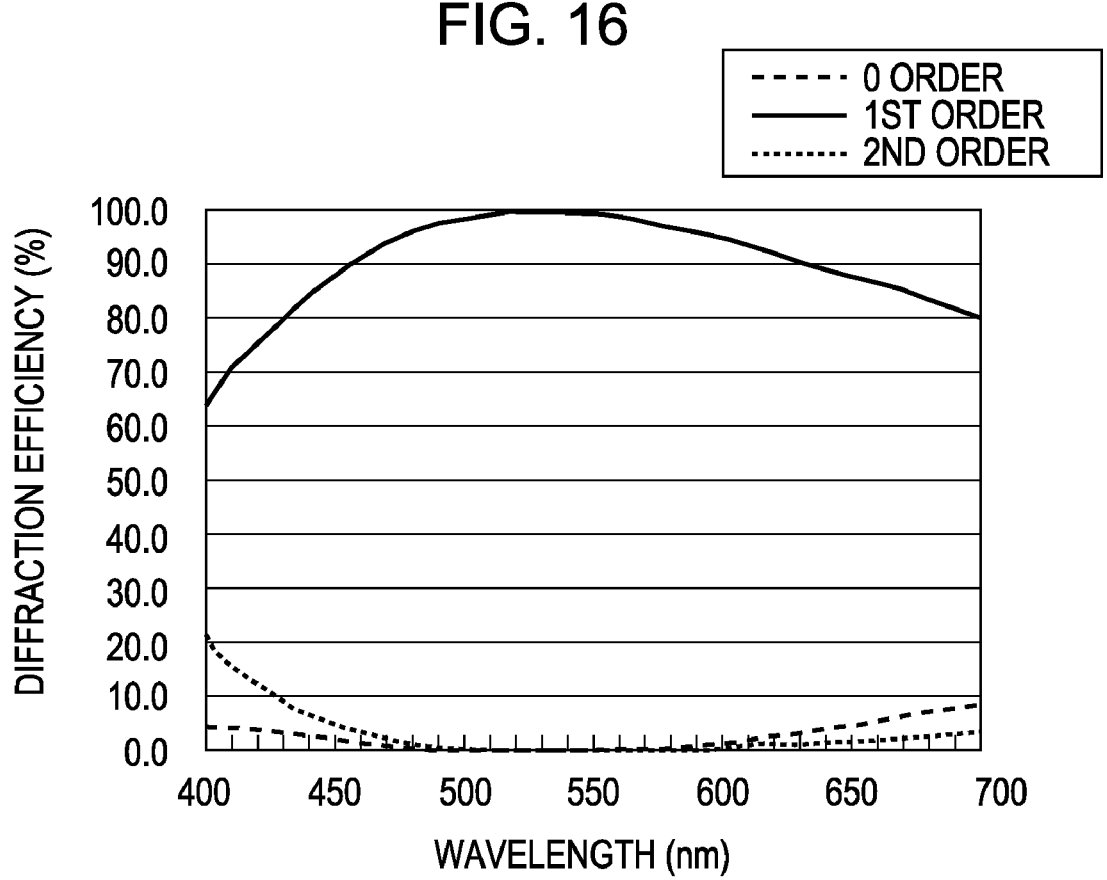
FIG. 16 is an explanatory diagram of the diffraction efficiency of the diffraction optical element having a single-layer configuration.

FIG. 15 is an explanatory diagram of a diffraction optical element according to the present invention. FIG. 16 is an explanatory diagram of the wavelength-dependent properties of a diffraction optical element according to the present invention.

Figure 17:
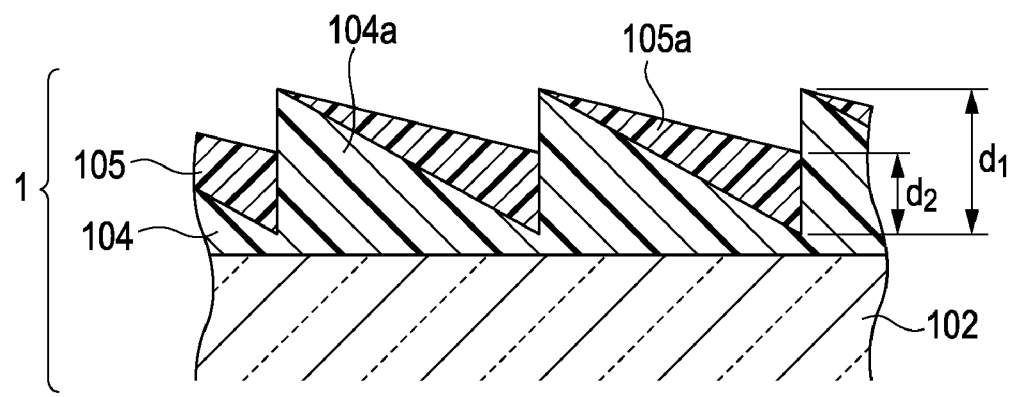
FIG. 17 is a cross-sectional view of a diffraction optical element having a layered configuration.
Figure 18:
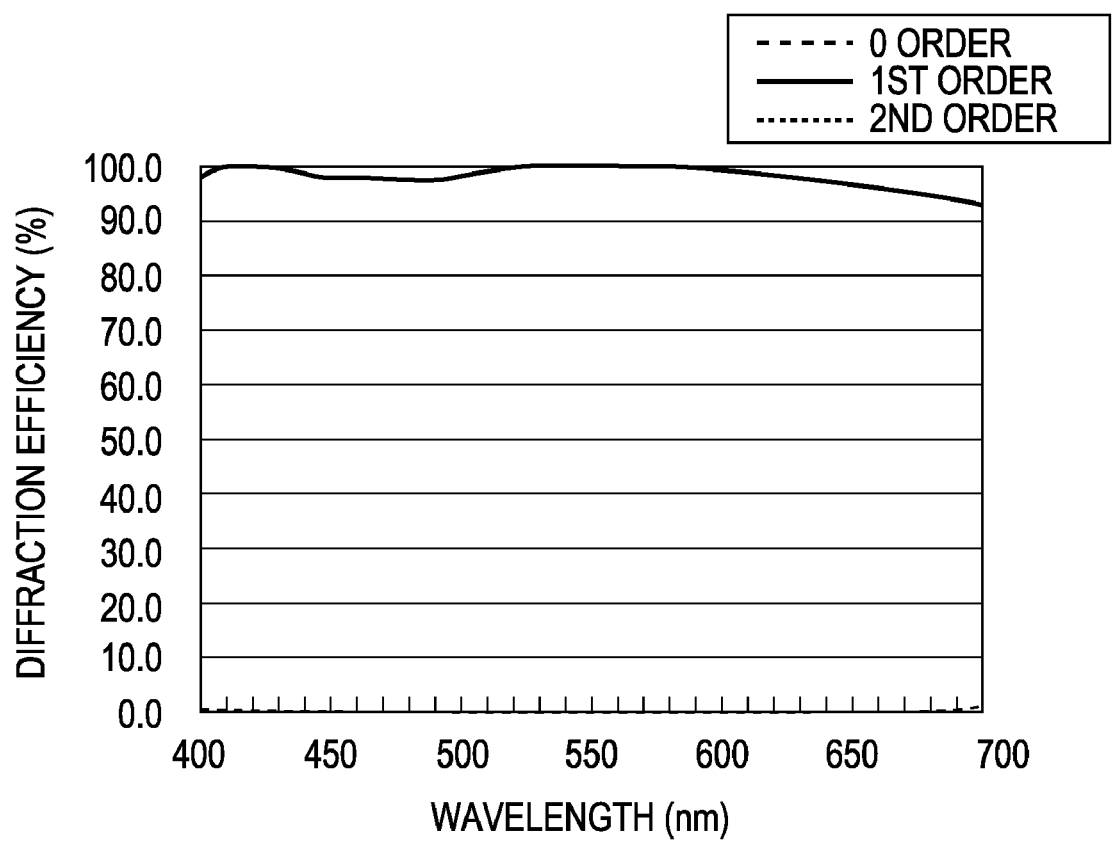
FIG. 18 is an explanatory diagram of the diffraction efficiency of the diffraction optical element having a layered configuration.

FIG. 17 is an explanatory diagram of a diffraction optical element according to the present invention. FIG. 18 is an explanatory diagram of the wavelength-dependent properties of a diffraction optical element according to the present invention.

Figure 19:
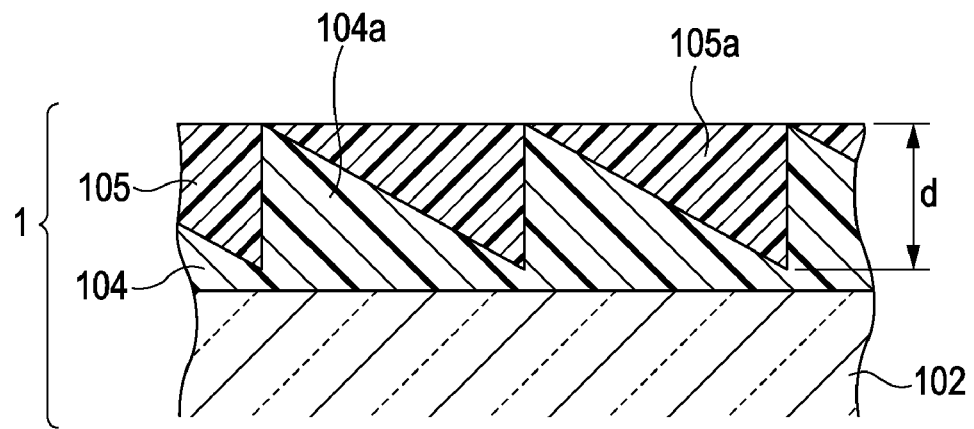
FIG. 19 is a cross-sectional view of a diffraction optical element having a layered configuration.
Figure 20:
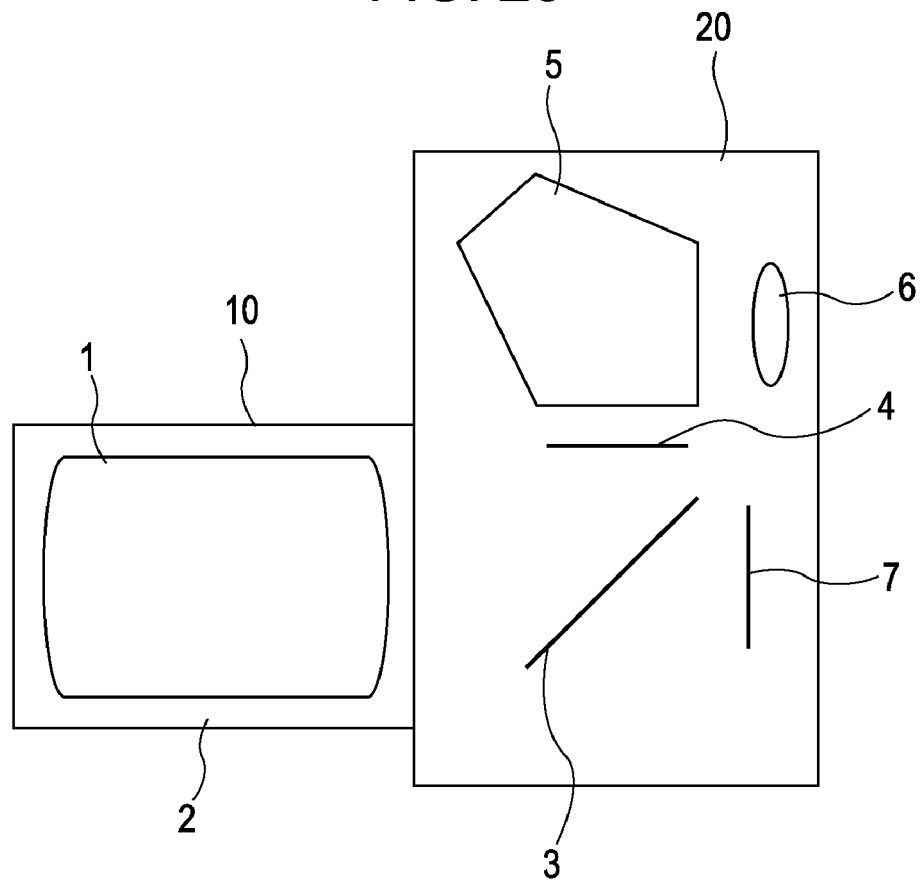
FIG. 20 is an explanatory diagram of an image pickup apparatus according to the present embodiment.

FIG. 19 is an explanatory diagram of a diffraction optical element according to the present invention. FIG. 20 is a principal-portion schematic diagram of an image pickup apparatus including the image pickup optical system according to the present invention.

In the lens cross-sectional views, LA denotes an image pickup optical system. SP denotes an aperture. L1 denotes a first lens unit having negative refractive power, L2 denotes a second lens unit having positive refractive power, and L3 denotes a third lens unit having positive refractive power. L2R1, L2R2, and L2R3 denote cemented lenses. IP denotes an image plane, and is equivalent to the image pickup surface of a solid-state image pickup element (photoelectric conversion element). RA denotes a diffraction optical part (diffraction optical face). G2n1 denotes a negative lens.

In the aberration charts, d and g denote in order a d-line and g-line. M and S denote a meridional image plane and sagittal image plane, and chromatic aberration of magnification is represented with a g-line. fno denotes an F number, and ω denotes a half field angle. All of the aberration charts are drawn in a scale with spherical aberration of 0.4 mm, astigmatism of 0.4 mm, distortion of 5%, and chromatic aberration of magnification of 0.05 mm.

Note that, with the fourth and fifth embodiments, the wide-angle end and telephoto end mean zoom positions when the second lens unit L2 for zooming is positioned mechanically at both ends of a movable range over the optical axis.

Like the first, second, and third embodiments, when the image optical system is a lens system of single focus length, the image optical system is made up of a lens configuration which satisfies the following various conditions.

The lens configuration includes an aperture, and includes one or more (preferably, multiple) cemented lenses closer to the image side than the aperture. The one or more cemented lenses include a cemented lens including a diffraction optical part (first cemented lens) on the cemented lens face. Further, it is desirable for the one or more cemented lenses to include one or more cemented lenses (i.e., to include multiple cemented lenses) differently (separately) from the cemented lens including the diffraction optical part (first cemented lens). Also, the lens configuration includes one or more negative lenses closer to the object side than the aperture.

Now, let us say that f is the focal length of the entire system, $v_{RN}$ is the Abbe number of the material of the negative lens of one cemented lens (second cemented lens) of the one or more cemented lenses disposed closer to the image side than the aperture, $f_{RN}$ is focal length within the air (subjected to air conversion), and $v_{FN}$ is the maximum Abbe number of the Abbe number of the material of the negative lens positioned closer to the object side than the aperture.

Let us say that $r_{avr}$ is the average value between the curvature radius of a face closest to the object side and the curvature radius of a face closest to the image side with the cemented lens including the diffraction optical part, $r_{DOE}$ is the curvature radius of the diffraction optical part, and $P_{\theta gF}$ is the partial dispersion ratio of a positive lens having the maximum difference of a partial dispersion ratio as to a reference line of the material of a positive lens disposed closer to the image side than the aperture.

Let us say that $v_{RP}$ is the Abbe number of the material of a positive lens having the maximum difference of a partial dispersion ratio as to a reference line of the material of a positive lens disposed closer to the image side than the aperture.

At this time, the following conditional expressions are satisfied.

$$-0.1 < f/(v_{RN} \times f_{RN}) < -0.02 \qquad (1)$$

$$80 < v_{FN} < 97 \qquad (2)$$

$$|r_{avr}/r_{DOE}| < 3 \qquad (3)$$

$$-0.02 < P_{\theta gF} - (-1.625 \times 10^{-3} \times v_{RP} + 0.642) < 0.03 \qquad (4)$$

Further preferably, with focal length according to the diffraction components alone of the diffraction optical part as $f_{DOE}$, the following conditional expression is satisfied.

$$40 < f_{DOE}/f < 200 \qquad (5)$$

Note here that, of the one or more cemented lenses disposed closer to the image side than the aperture, one cemented lens (second cemented lens) is preferably a cemented lens closest to the aperture, of the one or more cemented lenses.

Also, like the fourth and fifth embodiments, when the image pickup optical system is a zoom lens, the image pickup optical system is configured of a lens configuration which satisfies the following various conditions.

The lens configuration includes an aperture, and includes one or more (preferably, multiple) cemented lenses closer to the image side than the aperture. The one or more cemented lenses include a cemented lens including a diffraction optical part (first cemented lens) on the cemented lens face. Further, it is desirable for the one or more cemented lenses to include one or more cemented lenses (i.e., to include multiple cemented lenses) differently (separately) from the cemented lens including the diffraction optical part (first cemented lens). Also, the lens configuration includes one or more negative lenses closer to the object side than the aperture.

Now, let us say that $f_{ZW}$ is the focal length of the whole system at the wide angle end, $v_{ZRN}$ is the Abbe number of the material of the negative lens of one second cemented lens (second cemented lens) of the one or more cemented lenses disposed closer to the image side than the aperture, $f_{ZRN}$ is the focal length within the air (subjected to air conversion), and $v_{ZFN}$ is the maximum Abbe number of the Abbe number of the material of a negative lens positioned closer to the object side than the aperture.

Let us say that $r_{Zavr}$ is the average value between the curvature radius of a face closest to the object side and the curvature radius of a face closest to the image side of the cemented lens including the diffraction optical part, $r_{ZDOE}$ is the curvature radius of the diffraction optical part, and $P_{Z\theta gF}$ is the partial dispersion ratio of a positive lens having the maximum difference of a partial dispersion ratio as to a reference line of the material of a positive lens disposed closer to the image side than the aperture.

Let us say that $\nu_{ZRP}$ is the Abbe number of the material of a positive lens having the maximum difference of a partial dispersion ratio as to a reference line of the material of a positive lens disposed closer to the image side than the aperture. At this time, the following conditional expressions are satisfied.

$$-0.1 < f_{ZW}/(\nu_{ZRN} \times f_{ZRN}) < -0.02 \quad (6)$$

$$80 < \nu_{ZFN} < 97 \quad (7)$$

$$|r_{Zav}/r_{ZDOE}| < 3 \quad (8)$$

$$-0.02 < P_{Z\theta gF} - (-1.625 \times 10^{-3} \times \nu_{ZRP} + 0.642) < 0.03 \quad (9)$$

Further preferably, with focal length according to the diffraction components alone of the diffraction optical part as $f_{ZDOE}$, the following conditional expression is satisfied.

$$40 < f_{ZDOE}/f_{ZW} < 200 \quad (10)$$

Note here that, of the one or more cemented lenses disposed closer to the image side than the aperture, one cemented lens (second cemented lens) is preferably a cemented lens closest to the aperture, of the one or more cemented lenses.

Note that the conditional expressions (6) through (10) are equivalent to a case where the image pickup optical system is a zoom lens, and correspond to the conditional expressions (1) through (5) in a case where the image pickup optical system is a lens system of single focal length.

Also, the above-mentioned first and second cemented lenses may be the same cemented lens. That is to say, an arrangement may be made wherein the joint surface of the cemented lenses is the diffraction optical part (optical face having a diffraction function), and the conditional expressions (1) and (6) are satisfied. Also, with later-described specific embodiments of the present invention, multiple cemented lenses are provided, but the present invention is not restricted to this. That is to say, the present invention may be a case where the image pickup optical system includes only one cemented lens, or may be a case where the image pickup optical system includes four or more cemented lenses.

Next, the features of the lens configuration of each embodiment will be described. An image pickup optical system LA according to the first embodiment in FIG. 1 is a lens system of single focal length including a first lens unit L1 having negative refractive power, and second lens unit L2 having positive refractive power in order from the object side to the image side.

The first lens unit L1 is immobile for focusing. The second lens unit L2 moves to the object side at the time of focusing from an infinite-distance object to a short-distance object. An aperture SP is provided between the lenses of the second lens unit L2. A diffraction optical face is provided on the joint surface RA of a cemented lens L2R2 disposed closer to the image side than the aperture SP, and closest to an image plane IP. With the first embodiment, there may be provided one or more lens units which are immobile or move at the time of focusing to the image side of the second lens unit L2.

An image pickup optical system LA according to the second embodiment in FIG. 3 is a lens system of single focal length including a first lens unit L1 having negative refractive power, second lens unit L2 having positive refractive power, aperture SP, and third lens unit L3 having positive refractive power in order from the object side to the image side.

The first lens unit L1 is immobile for focusing. The second lens unit L2 moves to the object side as floating at the time of focusing from an infinite-distance object to a short-distance object. Also, the third lens unit L3 also moves to the object side at the time of focusing from an infinite-distance object to a short-distance object. At this time, the second lens unit L2 and third lens unit L3 move to the object side while reducing the interval between both. At this time, the aperture SP moves integral with the third lens unit L3.

A diffraction optical face is provided on the joint surface RA of a cemented lens L2R2 disposed closer to the image side of the third lens unit L3, and closest to an image plane IP. Also, with the second embodiment, there may be provided one or more lens units which are immobile or move at the time of focusing to the image side of the third lens unit L3.

An image pickup optical system LA according to the third embodiment in FIG. 5 is a lens system of single focal length including a first lens unit L1 having negative refractive power, second lens unit L2 having positive refractive power, aperture SP, and third lens unit L3 having positive refractive power in order from the object side to the image side.

The first lens unit L1 is immobile for focusing. The second lens unit L2 moves to the object side as floating at the time of focusing from an infinite-distance object to a short-distance object. Also, the third lens unit L3 also moves to the object side at the time of focusing from an infinite-distance object to a short-distance object.

At this time, the second lens unit L2 and third lens unit L3 move to the object side while reducing the interval between both. At this time, the aperture SP moves integral with the third lens unit L3. One cemented lens L2R1 is provided closer to the image side than the aperture SP.

A diffraction optical face is provided on the joint surface RA of a cemented lens L2R1 disposed closer to the image side of the third lens unit L3, and closest to the aperture SP. With the third embodiment, there may be provided one or more lens units which are immobile or move at the time of focusing to the image side of the third lens unit L3.

An image pickup optical system LA according to the fourth embodiment in FIG. 7 is a zoom lens including a first lens unit L1 having negative refractive power, second lens unit L2 having positive refractive power, and third lens unit L3 having positive refractive power in order from the object side to the image side.

At the time of zooming from the wide-angle end (short focal length end) to the telephoto end (long focal length end), the first lens unit L1 draws a convex locus to the image side to move over the optical axis, and corrects image plane fluctuation along with zooming. The second lens unit L2 moves to the object side at the time of zooming from the wide-angle end to the telephoto end.

An aperture SP is provided between the lenses of the second lens unit L2. A diffraction optical face is provided on the joint surface RA of a cemented lens L2R3 disposed closer to the image side than the aperture SP, and closest to an image plane IP. With the present embodiment, focusing is performed by moving the second lens unit L2. The third lens unit L3 performs an immovable image forming operation for zooming.

An image pickup optical system LA according to the fifth embodiment in FIG. 11 is a zoom lens including a first lens unit L1 having negative refractive power, and second lens unit L2 having positive refractive power in order from the object side to the image side.

At the time of zooming from the wide-angle end to the telephoto end, the first lens unit L1 draws a convex locus to the image side to move over the optical axis, and corrects image plane fluctuation along with zooming. The second lens unit L2 moves to the object side at the time of zooming from the wide-angle end to the telephoto end.

With the present embodiment, the first and second lens units L1 and L2 are lens units which move mutually independently at the time of zooming. Also, an aperture SP is included in the second lens unit L2, and at least one diffraction optical face is provided on the joint surface RA of a cemented lens L2R3 disposed closest to the image side than the aperture SP.

Note that, with the present embodiment, there may be provided one or more lens units which are immobile or move independently from other lens units at the time of zooming to the image side of the second lens unit L2. Also, with the present embodiment, focusing (focus adjustment) is performed by moving the entire zoom lens (first lens unit and second lens unit).

Note that, with each of the embodiments, there may be provided a lens unit such as a converter lens, afocal system, or the like to the object side of the first lens unit L1 or/and to the image side of a lens unit closest to the image side.

With the retrofocus-type image pickup optical system according to each of the embodiments, an off-axis light beam passes through a position relatively distant from the optical axis with a first lens unit having negative refractive power. Therefore, with the first lens unit, various aberrations, particularly chromatic aberration of magnification readily occurs frequently.

In general, in order to correct the various aberrations at this time, flexibility of design should be increased by increasing the number of lenses of each lens unit. However, increasing the number of lenses increases the entire lens system in size, resulting in increase in weight. Therefore, with each of the embodiments, the diffraction optical part RA which satisfies the conditional expressions (3) and (8) is provided at a position closer to the image side than the aperture SP where the incident height of an off-axis light beam becomes relatively high (lens face).

Thus, various aberrations, particularly chromatic aberration of magnification which occurs at the first lens unit L1, is corrected in a satisfactory manner. Further, in order to correct the chromatic aberration of the entire lens system in a satisfactory manner without increasing the power of the diffraction optical part, the cemented lens L2R1 wherein a positive lens and a negative lens are cemented is disposed closer to the image side than the aperture SP. Note that the cemented lens L2R1 is equivalent to a cemented lens positioned to the image side closest to the aperture SP.

Employing such a lens configuration reduces occurrence of chromatic aberration of magnification at the image pickup optical system. Also, correction of chromatic aberration of magnification with such a lens configuration has a tendency to excessively correct the chromatic aberration of magnification thereof. Therefore, a lens material is employed as the material of a negative lens positioned closer to the object side than the aperture SP, which satisfies the conditional expressions (2) and (7), and is low in dispersion and high in anomalous dispersion.

A lens material which is low in dispersion and high in anomalous dispersion is disposed as the material of a negative lens positioned closer to the object side than the aperture SP, thereby inversely correcting axial chromatic aberration which has been excessively corrected, and normally correcting chromatic aberration of magnification. Thus, chromatic aberration is corrected in a satisfactory manner as the entire lens system.

Employing such a lens configuration corrects the chromatic aberration of the entire lens system in a satisfactory manner without increasing the power of the diffraction optical part.

With each of the embodiments, the lens configuration of a lens unit where the diffraction optical part is provided is as follows.

With the first embodiment in FIG. 1, from the object side to the aperture SP of the second lens unit L2 are made up of two negative lenses and a positive in order from the object side to the image side. Also, from the aperture SP of the second lens unit L2 to the image plane are made up of, in order from the object side to the image side, the aperture SP, negative lens, cemented lens L2R1 wherein a positive lens and a negative lens are cemented mutually, positive lens, and cemented lens L2R2 wherein a negative lens and a positive lens are cemented mutually.

The diffraction optical part is formed on the joint surface RA of the cemented lens L2R2 wherein a negative lens and a positive lens are cemented which is disposed closest to the image side.

With the second embodiment in FIG. 3, the third lens unit L3 is made up of, in order from the object side to the image side, a cemented lens L2R1 wherein a positive lens and a negative lens are cemented mutually, positive lens, cemented lens L2R2 wherein a positive lens and a positive lens are cemented mutually. The diffraction optical part is formed on the joint surface RA of a cemented lens L2R2 wherein a positive lens and a positive lens are cemented mutually.

With the third embodiment in FIG. 5, the third lens unit L3 is made up of, in order from the object side to the image side, a cemented lens L2R1 wherein a positive lens and a negative lens are cemented mutually, positive lens, and positive lens. The diffraction optical part is formed on the joint surface RA of a cemented lens L2R1 wherein a positive lens and a negative lens are cemented mutually.

With the fourth embodiment in FIG. 7, the second lens unit L2 is made up of, in order from the object side to the image side, a positive lens, aperture SP, cemented lens L2R1 wherein a positive lens and a negative lens are cemented mutually, cemented lens L2R2 wherein a positive lens and a negative lens are cemented, and further cemented lens L2R3 wherein a positive lens and a positive lens are cemented mutually. Also, the diffraction optical part is formed on the joint surface RA of the cemented lens L2R3 disposed closest to the image side of the second lens unit L2.

With the fifth embodiment in FIG. 11, the second lens unit L2 is made up of, in order from the object side to the image side, a positive lens, aperture SP, two cemented lens L2R1 and L2R2 wherein a positive lens and a negative lens are cemented mutually, and cemented lens L2R3 wherein a positive lens and a positive lens are cemented mutually. The diffraction optical part is formed on the joint surface RA of the cemented lens L2R3 wherein a positive lens and a positive lens are cemented mutually.

Next, description will be made regarding the technical meanings of the above-mentioned respective conditional expressions. Note that the conditional expressions (1) through (5) correspond to the conditional expressions (6) through (10), and the technical content is equivalent to a lens system made up of single focal length, and a lens system made up of a zoom lens. Therefore, description will be made for each corresponding conditional expression.

The conditional expressions (1) and (6) relate to the chromatic-aberration-correction force of the negative lens of a cemented lens disposed closer to the image side than the aperture with the above-mentioned retrofocus-type lens.

Upon exceeding the upper limits of the conditional expressions (1) and (6), the correction force of chromatic aberration at the cemented lens L2R1 is reduced, and particularly, chromatic aberration of magnification remains mostly, and accordingly, the amount of correction assignment of chromatic aberration at the diffraction optical part increases. Consequently, the power of the diffraction optical part has to be increased, and accordingly, the pitch of diffraction gratings becomes fine, thereby forming a shape which makes it difficult to perform manufacturing.

On the other hand, upon exceeding the lower limits of the conditional expressions (1) and (6), the curvature radius of the negative lens G2n1 of the cemented lens L2R1 is reduced, and accordingly, higher order components of various aberrations readily occur, and consequently, the correction for these aberrations becomes difficult.

The conditional expressions (1) and (6) are preferably set as follows.

$$-0.08 < f/(v_{RN} \times f_{RN}) < -0.03 \tag{1a}$$

$$-0.08 < f_{ZW}/(v_{ZRN} \times f_{ZRN}) < -0.03 \tag{6a}$$

The conditional expressions (2) and (7) relate to the maximum Abbe number, of the Abbe number of the material of a negative lens positioned closer to the object side than the aperture SP. To employ a material exceeding the upper limits of the conditional expressions (2) and (7) as an optical member is difficult.

On the other hand, upon exceeding the lower limits of the conditional expressions (2) and (7), a lens material with high in dispersion and low in anomalous dispersion is employed, consequently. Therefore, axial chromatic aberration which is excessively corrected when correcting chromatic aberration of magnification at the diffraction optical part is difficult to be corrected in a satisfactory manner, and chromatic aberration remains mostly as the entire lens system.

Alternatively, even if chromatic aberration can be corrected at the diffraction optical part, the diffraction optical part has to have very strong power, which makes it difficult to manufacture diffraction gratings.

The conditional expressions (2) and (7) are preferably set as follows.

$$81 < v_{FN} < 96 \tag{2a}$$

$$81 < v_{ZFN} < 96 \tag{7a}$$

The conditional expressions (3) and (8) relate to the value of the curvature radius of the diffraction optical part (diffraction optical face). Upon exceeding the upper limits or lower limits of the conditional expressions (3) and (8), in either case, difference of an angle made up of a light beam input to the diffraction optical part, and a surface normal line of the diffraction optical part at a position where the light beam thereof is input is increased. Therefore, the diffraction efficiency of diffracted light at the design order deteriorates. The deterioration in diffraction efficiency becomes a cause of flaring due to unnecessary diffracted light, which is undesirable.

The conditional expressions (3) and (8) are further preferably set as follows.

$$|r_{avr}/r_{DOE}| < 2 \tag{3a}$$

$$|r_{Zavr}/r_{ZDOE}| < 2 \tag{8a}$$

The conditional expressions (4) and (9) relate to difference of a partial dispersion ratio as to a reference line of the material of a positive lens closer to the image side than the aperture SP, and the Abbe number thereof. Upon exceeding the upper limits of the conditional expressions (4) and (9), a material with very high in positive anomalous dispersion is employed as the positive lens closer to the image side than the aperture SP, consequently.

This directs to a satisfactory direction for correction conditions of chromatic aberration of magnification, but axial chromatic aberration which is excessively corrected at the diffraction optical part is further excessively corrected by this. Therefore, it becomes difficult to correct chromatic aberration in a balanced and satisfactory manner.

On the other hand, upon exceeding the lower limits of the conditional expressions (4) and (9), a material with very high in negative anomalous dispersion is employed as the positive lens closer to the image side than the aperture SP, consequently. As a result, chromatic aberration of magnification deteriorates, which is undesirable.

Also, in order to further improve optical performance, the numeric ranges of the conditional expressions (4) and (9) are preferably set as follows.

$$-0.02 < P_{\theta gF} - (-1.625 \times 10^{-3} \times v_{RP} + 0.642) < 0.025 \tag{4a}$$

$$-0.02 < P_{Z\theta gF} - (-1.625 \times 10^{-3} \times v_{ZRP} + 0.642) < 0.025 \tag{9a}$$

According to each of the embodiments, the respective constituent features are thus determined, correction of chromatic aberration can be performed over the entire screen in a satisfactory manner with the retrofocus-type image pickup optical system, and an image of high image quality can be readily obtained.

In particular, the diffraction optical part is provided closer to the image side than the aperture SP, whereby satisfactory optical performance can be maintained, and chromatic aberration of magnification which readily occurs around the screen can be effectively corrected.

The conditional expressions (5) and (10) are desirable conditional expressions to obtain further satisfactory optical performance. Note that, with each of the embodiments, the diffraction optical part means one or more diffraction gratings provided on the substrate (plain plate or lens). Also, the diffraction optical element means an element wherein the diffraction optical part made up of one or more diffraction gratings is provided on the substrate (plain plate or lens). In FIGS. 1 and 3, the cemented lens L2R2 is equivalent to the diffraction element. In FIG. 5, the cemented lens L2R1 is equivalent to the diffraction optical element. Also, in FIGS. 7 and 11, the cemented lens L2R3 is equivalent to the diffraction optical element.

Also, the refractive power (power=the inverse number of focal length) of the diffraction optical part is obtained as follows. When representing the shapes of diffraction gratings serving as the diffraction optical part with an expression of $$\phi(H) = (2_\pi \cdot m/\lambda_0) \cdot (C_2 \cdot H^2 + C_4 \cdot H^4 + C_{2i} \cdot H^{2i}) \tag{a}$$

where a reference wavelength (d-line) is $\lambda_0$, distance from the optical axis is H, and phase is $\phi$, according to the coefficient $C_2$ of the secondary term, refractive power $\phi_D$ is as follows.

$$\phi_D = -2 \cdot C_2$$

That is to say, the focal length $f_{DOE}$ of the diffraction optical part is represented with $$f_{DOE} = -1/(2 \cdot C_2).$$

The conditional expressions (5) and (10) are for maintaining satisfactory correction of various aberrations, and the power of the diffraction optical part in a balanced manner. Upon exceeding the upper limits of the conditional expressions (5) and (10), the power of the diffraction optical part becomes too weak, which makes it difficult to correct chromatic aberration over the entire screen region in a balanced manner.

On the other hand, upon exceeding the lower limits of the conditional expressions (5) and (10), the power of the diffraction optical part becomes strong, and the pitch of the diffraction gratings becomes too fine, which makes it difficult to perform manufacturing.

The conditional expressions (5) and (10) are preferably set as follows.

$$43 < f_{DOE}/f < 150 \tag{5a}$$

$$43 < f_{ZDOE}/f_{ZW} < 150 \tag{10a}$$

As described above, according to each of the embodiments, an image pickup optical system is obtained wherein chromatic aberration is corrected over the entire screen, and high optical performance is included.

With each of the embodiments, aspherical effects (optical work) may be provided to the diffraction optical part itself. The aspherical effects are, in the phase expression (a) of the diffraction optical part of each of the embodiments, realized by substituting values for the high-order terms of the coefficient $C_4$ of the quadruplicate term of the distance h from the optical axis, and thereafter.

Thus, in addition to the above-mentioned aspherical effects other than chromatic aberration, aspherical effects according to the diffraction gratings differ depending on wavelengths. Therefore, color difference fluctuation of spherical aberration can be readily corrected by the aspherical effects.

Now, description will be made regarding the configuration of the diffraction optical element employed for the image pickup optical system according to each of the embodiments. The diffraction optical part making up the diffraction optical element disposed closer to the image side than the aperture SP is made up of diffraction gratings which are rotation symmetry as to the optical axis.

FIG. 15 is an enlarged cross-sectional view of a portion of a diffraction optical part of a diffraction optical element 1, and diffraction gratings (diffraction optical part) 3 made up of a single layer is provided on a substrate (transparent substrate) 2. FIG. 16 is a diagram illustrating the diffraction efficiency properties of the diffraction optical element 1. In FIG. 16, the horizontal axis represents wavelengths, and the vertical axis represents diffraction efficiency. Note that diffraction efficiency is the rate of the light quantity of diffracted light as to the whole transmitted light fluxes. Reflected light at the grating border plane of a grating portion 3a complicates description, and accordingly will not be taken into consideration here.

The optical material of the diffraction gratings 3 is configured such that an ultraviolet curing resin (refractive index $n_d$=1.513, Abbe number $v_d$=51.0) is employed, the grating thickness $d_1$ is set to 1.03 μm, and the diffraction efficiency of +1st order diffracted light becomes the peak at a wavelength of 530 nm. That is to say, the design order is +1st order, and the design wavelength is a wavelength of 530 nm. In FIG. 16, the diffraction efficiency of the +1st order diffracted light is illustrated with a solid line.

Further, in FIG. 16, the diffraction efficiency of the diffraction order (0 order and +2nd order which are +1st order ±1 order) near the design order is also described. As can be understood from the drawing, the diffraction efficiency at the design order exhibits its peak at around the design wavelength, and gradually decreases at wavelengths other than that.

This lowering quantity of the diffraction efficiency at the design order results in diffracted light (unnecessary light) at another order, and becomes a cause of flaring. Also, in the event that the diffraction optical element is used at multiple portions within the optical system, the lowering at a wavelength other than the design wavelength leads to the lowering of transmittances.

Next, description will be made regarding a layered diffraction optical element wherein multiple diffraction gratings made up of different materials are layered. FIG. 17 is a partial enlarged cross-sectional view of a layered diffraction element 1, and FIG. 18 is a diagram representing the wavelength dependency of the diffraction efficiency of the +1st order diffracted light of the diffraction optical element 1 shown in FIG. 17.

With the diffraction optical element 1 shown in FIG. 17, a first diffraction grating 104 made up of an ultraviolet curing resin (refractive index $n_d$=1.499, Abbe number $v_d$=54) is formed on the substrate 102. A second diffraction grating 105 (refractive index $n_d$=1.598, Abbe number $v_d$=28) is further formed thereupon. Let us say that with this combination of materials, the grating thickness $d_1$ of a grating portion 104a of the first diffraction grating 104 is set to 13.8 μm, and the grating thickness $d_2$ of a grating portion 105a of the second diffraction grating 105 is set to 10.5 μm.

As can be understood from FIG. 18, the diffraction optical element 1 including the diffraction gratings 104 and 105 having a layered configuration is employed, whereby with the diffracted light of the design order, high diffraction efficiency is obtained, such as 95% or more at the whole used wavelength regions (visible region, here).

Note that as for the above-mentioned diffraction optical element 1 having a layered configuration, the material making up the diffraction gratings is not restricted to an ultraviolet curing resin, and rather another plastic material or the like can be employed, and a first layer may be directly formed on the substrate depending on the substrate. Also, there is no need to necessarily change the thickness of each grating. The thickness of the layer 104 and that of the layer 105 may be the same as shown in FIG. 19 depending on the combination of materials.

In this case, a grating shape is not formed on the surface, and accordingly dust-proofness is excellent, so the assembling workability of the diffraction optical element can be improved. Moreover, there is no need to necessarily contact between the diffraction gratings 104 to the diffraction gratings 105 tightly, and rather the layers of the two diffraction gratings may be disposed across an air layer.

The diffraction optical part is provided on the optical face, but the base thereof may be spherical, planar, or aspherical. Also, the diffraction optical part may be fabricated with a so-called replica aspherical surface which is a method for applying a film such as plastic or the like to the optical face thereof as a diffraction optical part (diffraction face).

The diffraction optical part has great anomalous dispersion, so the diffraction optical part is thus provided closer to the image side than the aperture, whereby correction of chromatic aberration of magnification, particularly around the screen, can be performed effectively.

With the shape of the diffraction gratings, with the phase coefficient of the 2i-th order term thereof as $C_{2i}$, a phase $\phi(H)$ at distance H from the optical axis is represented with the following expression such as the above-mentioned expression (a), where m denotes a diffraction order, and $\lambda_0$ denotes a reference wavelength.

$$\phi(H) = \left(2\pi \frac{m}{\lambda_0}\right) \cdot (C_2 \cdot H^2 + C_4 \cdot H^4 + C_6 \cdot H^6 \ldots + C_{2i} \cdot H^{2i}) \quad (a)$$

In general, Abbe number (dispersion value) $V_d$ of a diffraction optical material such as a lens, prism, or the like is represented with the following expression when the refractive power at the respective wavelengths of the d, C, and F lines as $N_d$, $N_C$, and $N_F$.

$$V_d = (N_d - 1)/(N_F - N_C) > 0 \quad (b)$$

On the other hand, with the respective wavelengths of d, C, and F lines as $\lambda_d$, $\lambda_C$, and $\lambda_F$, the Abbe number $V_d$ of the diffraction optical part is represented with $$V_d = \lambda_d/(\lambda_F - \lambda_C) > 0 \quad (c),$$

and the $V_d$ becomes −3.45.

Thus, the dispersiveness of an arbitrary wavelength has the opposite operation of the diffraction optical element.

Also, the refractive power φ of paraxial temporal diffracted light (m=1) with a reference wavelength of the diffraction optical part is, with the coefficient of the secondary term is $C_2$ from the previous expression (a) representing the phase of the diffraction optical part, represented with $$\phi = -2 \cdot C_2.$$

Further, with an arbitrary wavelength as λ, and reference wavelength as $\lambda_0$, change in refractive power of the arbitrary wavelength as to the reference wavelength is represented with the following expression.

$$\phi' = (\lambda/\lambda_0) \times (-2 \cdot C_2) \quad (d)$$

Thus, as the features of the diffraction optical part, the phase coefficient $C_2$ of the previous expression (a) is changed, whereby great dispersiveness can be obtained with weak change in paraxial refractive power. This means that correction of chromatic aberration is performed without giving great influence to various aberrations other than chromatic aberration. Also, with regard to high-order coefficients of the phase coefficient $C_4$ and thereafter, effects similar to those of an aspherical face can be obtained according to change in refractive power as to change in light beam input height of the diffraction optical part.

Simultaneously therewith, change in refractive power of an arbitrary wavelength can be applied to a reference wavelength according to change in light beam input height. Therefore, this is advantageous to correction of chromatic aberration of magnification.

First through fourth numerical embodiments corresponding to the first through fourth embodiments of the present invention will be shown below. With the respective numerical embodiments, i denotes the face order from the object side. Ri denotes the curvature radius of the i'th face in order from the object side, Di denotes the interval of the i'th face and the i+1'th face, and Ni and νi are the refractive index and Abbe number of the i'th optical material, respectively. Also, f, fno, and 2ω denote the focal length, F number, and field angle (degree) of the entire system when focusing on an infinite-distance object, respectively.

With the optical axial direction as an X axis, the direction perpendicular to the optical axis as an H axis, the advancing direction of light as positive, R as a paraxial radius of curvature, k as eccentricity, and A, B, C, D, and E as aspherical coefficients respectively, an aspherical shape is represented with the following expression.

$$X = \frac{\left(\frac{H^2}{R}\right)}{\left\{1 + \sqrt{1 - (1+K) \cdot \left(\frac{H}{R}\right)^2}\right\}} + A \cdot H^2 + B \cdot H^4 + C \cdot H^6 + D \cdot H^8 + E \cdot H^{10}$$

The diffraction optical part (diffraction face) is represented by giving the phase coefficient of the phase function of the above-mentioned expression (a). The relations between the above-mentioned respective conditional expressions, and various numeric values according to a numerical embodiment will be shown in Table 1.

| | (First Numerical Embodiment) f = 27.14 fno = 1.85 2ω = 77.1° | | | |
|---|---|---|---|---|
| | r1 = 79.348 | d1 = 2.30 | n1 = 1.69895 | ν1 = 30.13 |
| | r2 = 26.877 | d2 = 7.70 | | |
| | r3 = 287.341 | d3 = 4.00 | n2 = 1.80610 | ν2 = 40.92 |
| | r4 = −81.547 | d4 = 5.40 | | |
| | r5 = 161.573 | d5 = 1.40 | n3 = 1.43875 | ν3 = 94.99 |
| | r6 = 16.310 | d6 = 7.00 | | |
| | r7 = −22.754 | d7 = 1.20 | n4 = 1.49700 | ν4 = 81.54 |
| | r8 = −57.407 | d8 = 0.20 | | |
| | r9 = 30.096 | d9 = 7.12 | n5 = 1.80610 | ν5 = 40.92 |
| | r10 = −54.258 | d10 = 3.20 | | |
| aperture | r11 = 0.000 | d11 = 3.80 | | |
| | r12 = −38.600 | d12 = 1.80 | n6 = 1.58267 | ν6 = 46.40 |
| aspherical surface | r13 = −45.345 | d13 = 3.12 | | |
| | r14 = −229.998 | d14 = 6.29 | n7 = 1.62280 | ν7 = 57.05 |
| | r15 = −17.557 | d15 = 2.33 | n8 = 1.80518 | ν8 = 25.42 |
| | r16 = −480.929 | d16 = 1.10 | | |
| aspherical surface | r17 = −68.236 | d17 = 3.30 | n9 = 1.77250 | ν9 = 49.60 |
| | r18 = −23.979 | d18 = 0.20 | | |
| | r19 = −44.370 | d19 = 2.00 | n10 = 1.77250 | ν10 = 49.60 |
| diffraction optical element | r20 = −50.000 | d20 = 3.00 | n11 = 1.77250 | ν11 = 49.60 |
| | r21 = −29.310 | | | |

-continued (First Numerical Embodiment)
f = 27.14  fno = 1.85  2ω = 77.1° aspherical coefficient

| | | | | |
|---|---|---|---|---|
| thirteen faces | K = −5.551948 | A = 0 | | |
| | B = 1.822028 × 10$^{-5}$ | C = −1.163476 × 10$^{-8}$ | D = 1.892872 × 10$^{-10}$ | |
| | E = 0 | | | |
| seventeen faces | K = −2.437060 | A = 0 | | |
| | B = −4.919794 × 10$^{-6}$ | C = −6.089238 × 10$^{-8}$ | D = 1.709518 × 10$^{-10}$ | |
| | E = 0 | | | | phase coefficient

| | | |
|---|---|---|
| twenty faces | $C_2$ = −2.850000 × 10$^{-4}$ | $C_4$ = 3.255320 × 10$^{-6}$ |
| | $C_6$ = −2.902145 × 10$^{-8}$ | $C_8$ = 7.861186 × 10$^{-11}$ |

(Second Numerical Embodiment)
f = 24.50  fno = 1.45  2ω = 82.9°

| | | | | |
|---|---|---|---|---|
| | r1 = 75.929 | d1 = 2.50 | n1 = 1.74950 | ν1 = 35.30 |
| | r2 = 31.485 | d2 = 6.83 | | |
| | r3 = 69.545 | d3 = 2.00 | n2 = 1.71300 | ν2 = 53.87 |
| | r4 = 46.040 | d4 = 4.48 | | |
| | r5 = 156.773 | d5 = 4.68 | n3 = 1.72825 | ν3 = 28.46 |
| | r6 = −141.762 | d6 = 4.35 | | |
| | r7 = 45.754 | d7 = 2.00 | n4 = 1.84666 | ν4 = 23.78 |
| | r8 = 64.194 | d8 = 1.57 | n5 = 1.49700 | ν5 = 81.54 |
| | r9 = 20.762 | d9 = 8.30 | | |
| flare-cut | r10 = 0.000 | d10 = 7.16 | | |
| aspherical surface | r11 = 33.603 | d11 = 6.16 | n6 = 1.80400 | ν6 = 46.57 |
| | r12 = −81.948 | d12 = 0.14 | | |
| | r13 = 532.934 | d13 = 2.00 | n7 = 1.71736 | ν7 = 29.50 |
| | r14 = 57.860 | d14 = 4.82 | | |
| aperture | r15 = 0.000 | d15 = 6.97 | | |
| aspherical surface | r16 = −18.245 | d16 = 2.80 | n8 = 1.78800 | ν8 = 47.37 |
| | r17 = −15.000 | d17 = 4.03 | n9 = 1.84666 | ν9 = 23.78 |
| aspherical surface | r18 = −45.000 | d18 = 1.35 | | |
| | r19 = −61.980 | d19 = 5.50 | n10 = 1.60300 | ν10 = 65.44 |
| | r20 = −25.495 | d20 = 0.50 | | |
| | r21 = −198.359 | d21 = 2.04 | n11 = 1.77250 | ν11 = 49.60 |
| diffraction optical element | r22 = −70.000 | d22 = 3.83 | n12 = 1.77250 | ν12 = 49.60 |
| | r23 = −28.950 | | | | aspherical coefficient

| | | | |
|---|---|---|---|
| eleven faces | K = 0 | A = 0 | B = 4.819838 × 10$^{-6}$ |
| | C = 1.457874 × 10$^{-8}$ | D = 0 | E = 0 |
| sixteen faces | K = 0 | A = 0 | B = −1.471470 × 10$^{-5}$ |
| | C = −8.790018 × 10$^{-8}$ | D = 0 | E = 0 |
| eighteen faces | K = 0 | A = 0 | B = 1.340848 × 10$^{-5}$ |
| | C = 1.117091 × 10$^{-8}$ | D = 0 | E = 0 | phase coefficient

| | | | | |
|---|---|---|---|---|
| twenty-two faces | $C_2$ = −2.5 × 10$^{-4}$ | $C_4$ = 1.401522 × 10$^{-7}$ | $C_6$ = −3.426628 × 10$^{-10}$ | $C_8$ = 0 |

(Third Numerical Embodiment)
f = 25.00  fno = 1.45  2ω = 81.8°

| | | | |
|---|---|---|---|
| r1 = 78.121 | d1 = 2.50 | n1 = 1.74950 | ν1 = 35.30 |
| r2 = 32.095 | d2 = 6.83 | | |
| r3 = 65.703 | d3 = 2.00 | n2 = 1.71300 | ν2 = 53.87 |
| r4 = 43.793 | d4 = 4.48 | | |
| r5 = 131.902 | d5 = 4.68 | n3 = 1.72825 | ν3 = 28.46 |
| r6 = −163.186 | d6 = 4.35 | | |
| r7 = 42.146 | d7 = 2.00 | n4 = 1.84666 | ν4 = 23.78 |
| r8 = 59.274 | d8 = 1.57 | n5 = 1.49700 | ν5 = 81.54 |
| r9 = 20.134 | d9 = 8.30 | | |

-continued (Third Numerical Embodiment)
f = 25.00 fno = 1.45 2ω = 81.8°

| | | | | |
|---|---|---|---|---|
| flare-cut | r10 = 0.000 | d10 = 7.16 | | |
| aspherical surface | r11 = 35.173 | d11 = 6.16 | n6 = 1.80400 | ν6 = 46.57 |
| | r12 = −85.566 | d12 = 0.14 | | |
| | r13 = 416.810 | d13 = 2.00 | n7 = 1.71736 | ν7 = 29.50 |
| | r14 = 61.735 | d14 = 4.82 | | |
| aperture | r15 = 0.000 | d15 = 6.97 | | |
| aspherical surface | r16 = −17.979 | d16 = 2.80 | n8 = 1.78800 | ν8 = 47.37 |
| diffraction optical element | r17 = −15.435 | d17 = 4.03 | n9 = 1.84666 | ν9 = 23.78 |
| aspherical surface | r18 = −44.511 | d18 = 1.35 | | |
| | r19 = −65.915 | d19 = 5.50 | n10 = 1.60300 | ν10 = 65.44 |
| | r20 = −25.408 | d20 = 0.50 | | |
| | r21 = −143.210 | d21 = 5.87 | n11 = 1.77250 | ν11 = 49.60 |
| | r22 = −28.172 | | | | aspherical coefficient

| | | | |
|---|---|---|---|
| eleven faces | K = −2.923215 × 10$^{-2}$ | A = 0 | B = 6.397828 × 10$^{-6}$ |
| | C = 1.291866 × 10$^{-8}$ | D = 1.776586 × 10$^{-11}$ | E = 0 |
| sixteen faces | K = 1.831745 × 10$^{-1}$ | A = 0 | B = −1.465469 × 10$^{-5}$ |
| | C = −4.396420 × 10$^{-8}$ | D = −3.895783 × 10$^{-10}$ | E = 0 |
| eighteen faces | K = 1.866496 × 10$^{-1}$ | A = 0 | B = 1.340848 × 10$^{-5}$ |
| | C = 1.362589 × 10$^{-8}$ | D = −1.731705 × 10$^{-11}$ | E = 0 | phase coefficient

| | | | | |
|---|---|---|---|---|
| seventeen faces | $C_2$ = −4.5 × 10$^{-4}$ | $C_4$ = −4.160004 × 10$^{-7}$ | $C_6$ = −6.436551 × 10$^{-9}$ | $C_8$ = 0 |

(Fourth Numerical Embodiment)
f = 24.33~36.50~47.00 fno = 3.4~4.0~4.7 2ω = 83.3°~61.3°~49.4°

| | | | | |
|---|---|---|---|---|
| | r1 = 55.684 | d1 = 1.71 | n1 = 1.69680 | ν1 = 55.53 |
| aspherical surface | r2 = 14.818 | d2 = 7.75 | | |
| | r3 = −129.321 | d3 = 1.44 | n2 = 1.49700 | ν2 = 81.54 |
| | r4 = 247.169 | d4 = 4.31 | | |
| | r5 = 28.943 | d5 = 2.00 | n3 = 1.80518 | ν3 = 25.42 |
| | r6 = 42.588 | d6 = 22.78 | | |
| | r7 = 30.646 | d7 = 2.40 | n4 = 1.61800 | ν4 = 63.33 |
| | r8 = 162.705 | d8 = 2.00 | | |
| aperture | r9 = 0.000 | d9 = 3.00 | | |
| | r10 = 25.311 | d10 = 7.00 | n5 = 1.72000 | ν5 = 43.69 |
| | r11 = −16.000 | d11 = 1.10 | n6 = 1.80440 | ν6 = 39.59 |
| | r12 = 34.294 | d12 = 0.34 | | |
| | r13 = 21.159 | d13 = 2.00 | n7 = 1.69680 | ν7 = 55.53 |
| | r14 = 82.977 | d14 = 1.43 | n8 = 1.80518 | ν8 = 25.42 |
| aspherical surface | r15 = 19.491 | d15 = 2.33 | | |
| | r16 = −43.012 | d16 = 1.50 | n9 = 1.74950 | ν9 = 35.30 |
| diffraction optical element | r17 = −27.445 | d17 = 1.00 | n10 = 1.74950 | ν10 = 35.30 |
| | r18 = −21.180 | d18 = −0.5 | | |
| flare-cut | r19 = 0.000 | d19 = 2.20 | | |
| | r20 = 45.048 | d20 = 1.55 | n11 = 1.67790 | ν11 = 55.34 |
| | r21 = 48.745 | | | |

TABLE 1

| | Focal Length | | |
|---|---|---|---|
| Variable Interval | 24.33 | 36.50 | 47.00 |
| d6 | 22.78 | 7.72 | 0.99 |
| D17 | −0.5 | 11.65 | 22.15 |

| | aspherical coefficient | | |
|---|---|---|---|
| two faces | $K = -6.005160 \times 10^{-1}$ | $A = 0$ | $B = 8.641561 \times 10^{-6}$ |
| | $C = 2.010743 \times 10^{-8}$ | $D = 1.155441 \times 10^{-10}$ | $E = 0$ |
| fifteen faces | $K = 1.871816 \times 10^{-1}$ | $A = 0$ | $B = 1.940241 \times 10^{-5}$ |
| | $C = -5.430970 \times 10^{-8}$ | $D = -3.892404 \times 10^{-10}$ | $E = 0$ |

| phase coefficient | | | | |
|---|---|---|---|---|
| seventeen faces | $C_2 = -4.210025 \times 10^{-4}$ | $C_4 = 1.501475 \times 10^{-6}$ | $C_6 = 2.640553 \times 10^{-8}$ | $C_8 = 0$ |

(Fifth Numerical Embodiment)
$f = 26.00 \sim 39.00 \sim 50.23$ fno $= 3.4 \sim 4.0 \sim 4.7$ $2\omega = 79.5° \sim 58.0° \sim 46.6°$

| | | | | |
|---|---|---|---|---|
| aspherical surface | r1 = 53.305 | d1 = 1.71 | n1 = 1.67790 | ν1 = 55.34 |
| | r2 = 14.992 | d2 = 7.75 | | |
| | r3 = −69.912 | d3 = 1.44 | n2 = 1.49700 | ν2 = 81.54 |
| | r4 = −818.638 | d4 = 4.40 | | |
| | r5 = 29.683 | d5 = 1.98 | n3 = 1.80518 | ν3 = 25.42 |
| | r6 = 43.129 | d6 = 22.78 | | |
| | r7 = 31.681 | d7 = 2.40 | n4 = 1.60300 | ν4 = 65.44 |
| | r8 = 166.875 | d8 = 2.00 | | |
| aperture | r9 = 0.000 | d9 = 3.00 | | |
| | r10 = 25.894 | d10 = 7.00 | n5 = 1.72000 | ν5 = 43.69 |
| | r11 = −16.000 | d11 = 1.10 | n6 = 1.80440 | ν6 = 39.59 |
| | r12 = 37.802 | d12 = 0.12 | | |
| | r13 = 20.609 | d13 = 2.06 | n7 = 1.67790 | ν7 = 55.34 |
| | r14 = 84.473 | d14 = 0.99 | n8 = 1.80518 | ν8 = 25.42 |
| aspherical surface | r15 = 19.578 | d15 = 2.24 | | |
| | r16 = −66.137 | d16 = 1.50 | n9 = 1.72047 | ν9 = 34.70 |
| diffraction optical element | r17 = −27.445 | d17 = 1.00 | n10 = 1.72047 | ν10 = 34.70 |
| | r18 = −22.799 | d18 = 1.70 | | |
| | r19 = 35.354 | d19 = 1.55 | n11 = 1.69680 | ν11 = 55.53 |
| | r20 = 29.726 | | | |

TABLE 2

| | Focal Length | | |
|---|---|---|---|
| Variable Interval | 26.00 | 39.00 | 50.23 |
| d6 | 22.78 | 7.71 | 0.98 |

| | aspherical coefficient | | | |
|---|---|---|---|---|
| two faces | $K = -7.561357 \times 10^{-1}$ | $A = 0$ | $B = 1.490985 \times 10^{-5}$ | $C = 3.294366 \times 10^{-8}$ |
| | $D = 1.618048 \times 10^{-10}$ | $E = 0$ | | |
| fifteen faces | $K = -7.416346 \times 10^{-2}$ | $A = 0$ | $B = 2.116973 \times 10^{-5}$ | $C = -3.040086 \times 10^{-8}$ |
| | $D = -2.361996 \times 10^{-10}$ | $E = 0$ | | |

| phase coefficient | | | | |
|---|---|---|---|---|
| seventeen faces | $C_2 = -3.775107 \times 10^{-4}$ | $C_4 = 2.767968 \times 10^{-6}$ | $C_6 = 1.050820 \times 10^{-8}$ | $C_8 = 0$ |

TABLE 3

| Conditional Expression | First Embodiment | Second Embodiment | Third Embodiment | Fourth Embodiment | Fifth Embodiment |
|---|---|---|---|---|---|
| (1) $f/(f_{VRN} \times f_{RN})$ | −0.047 | −0.036 | −0.034 | | |
| (2) VFN | 94.99 | 81.54 | 81.54 | | |
| (3) $|r_{avr}/r_{DOE}|$ | 0.74 | 1.62 | 2.02 | | |
| (4) $P_{\theta gF} - (-1.625 \times 10^{-3} \times \nu_{VRP} + 0.642)$ | −0.0094 | −0.0094 | −0.0094 | | |

TABLE 3-continued

| Conditional Expression | First Embodiment | Second Embodiment | Third Embodiment | Fourth Embodiment | Fifth Embodiment |
|---|---|---|---|---|---|
| (5) $f_{DOE}/f$ | 64.6 | 81.6 | 44.4 | | |
| (6) $f_{ZW}/(v_{ZRN} \times f_{ZRN})$ | | | | −0.046 | −0.047 |
| (7) VZFN | | | | 81.54 | 81.54 |
| (8) $|r_{Zavr}/r_{ZDOE}|$ | | | | 1.17 | 1.62 |
| (9) $P_{Z\theta qF} - (-1.625 \times 10^{-3} \times v_{ZRP} + 0.642)$ | | | | −0.0084 | −0.0049 |
| (10) $f_{ZDOE}/f_{ZW}$ | | | | 48.8 | 50.9 |

Next, an embodiment wherein optical systems shown in the first through fifth numerical embodiments are applied to an image pickup apparatus (camera system) will be described with reference to FIG. 20. FIG. 20 is a principal-portion schematic diagram of a single-lens reflex camera. In FIG. 20, reference numeral 10 denotes an image pickup lens including an image pickup optical system 1 according to the first through fifth numerical embodiments. The image pickup optical system 1 is held by a lens barrel 2 which is a holding member.

Reference numeral 20 denotes a camera main unit. The camera main unit includes a quick return mirror 3 which reflects a light flux from the image pickup lens 10 upwards, a focusing plate 4 disposed in the image forming position of the image pickup lens 10, and a pentagonal roof prism 5 which converts a reverse image formed on the focusing plate 4 into an erect image, and further includes an eyepiece lens 6 for observing the erect image thereof, and so forth.

Reference numeral 7 is a photosensitive surface on which a solid-state image pickup element (photoelectric conversion element) such as a CCD sensor, CMOS sensor, or the like, and a silver-salt film are disposed. The quick return mirror 3 is evacuated from the optical path at the time of shooting, and an image is formed on the photosensitive surface 7 by the image pickup lens 10.

Thus, the image pickup optical system according to the first through fifth numerical embodiments is applied to a digital camera or the like, whereby an image pickup apparatus having high optical performance can be realized.

According to the present embodiment, an image pickup optical system having high optical performance whereby chromatic aberration can be suitably corrected over the entire screen, and an image pickup apparatus including the image pickup optical system thereof can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2008-042755 filed Feb. 25, 2008, which is hereby incorporated by reference herein in its entirety.

What is claimed is:

1. An image pickup optical system comprising:
a first lens unit having negative refractive power;
a second lens unit having positive refractive power and being disposed closer to an image side than the first lens unit, which moves at the time of focusing; and
an aperture;
wherein the image pickup optical system includes
one or more cemented lenses disposed closer to the image side than the aperture; and
one or more negative lenses disposed closer to an object side than the aperture; and
wherein a diffraction optical part is provided on the joint surface of a first cemented lens of the one or more cemented lenses, and the conditional expressions of $-0.1 < f/(v_{RN} \times f_{RN}) < -0.02$, $80 < v_{FN} < 97$, $|r_{avr}/r_{DOE}| < 3$, and $-0.02 < P_{\theta gF} - (-1.625 \times 10^{-3} \times v_{RP} + 0.642) < 0.03$ are satisfied in which
f represents the focal length of the whole system,
$v_{RN}$ and $f_{RN}$ represent the Abbe number of the material of a negative lens of a second cemented lens of the one or more cemented lenses, and the focal length of the negative lens of the second cemented lens of the one or more cemented lenses within the air, respectively,
$v_{FN}$ represents the maximum Abbe number, of the Abbe number of the material of a negative lens disposed closer to the object side than the aperture,
$r_{avr}$ represents the average value between the curvature radius of a face closest to the object side and the curvature radius of a face closest to the image side of the first cemented lens including the diffraction optical part,
$r_{DOE}$ represents the curvature radius of the diffraction optical part,
$P_{\theta gF}$ represents the partial dispersion ratio of a positive lens having the maximum difference of a partial dispersion ratio as to a reference line of the material of a positive lens disposed closer to the image side than the aperture, and
$v_{RP}$ represents the Abbe number of the material of a positive lens having the maximum difference of a partial dispersion ratio as to a reference line of the material of a positive lens disposed closer to the image side than the aperture.

2. The image pickup optical system according to claim 1, wherein the first lens unit and the second lens unit are lens units which move mutually independently at the time of zooming.

3. The image pickup optical system according to claim 1, wherein, of the one or more cemented lenses, a cemented lens disposed closest to the aperture is the second cemented lens.

4. The image pickup optical system according to claim 1, wherein the first cemented lens and the second cemented lens are the same cemented lens.

5. The image pickup optical system according to claim 1, wherein the conditional expression of $40 < f_{DOE}/f < 200$ is satisfied in which $f_{DOE}$ represents the focal length according to only the diffraction components of the diffraction optical part.

6. The image pickup optical system according to claim 1, further comprising one or more lens units at the image side of the second lens unit, which do not move or move independently from other lens units at the time of zooming.

7. An image pickup apparatus comprising:
an image pickup optical system including,
a first lens unit having negative refractive power;
a second lens unit having positive refractive power and being disposed closer to an image side than the first lens unit, which moves at the time of focusing; and
an aperture;
wherein the image pickup optical system includes
one or more cemented lenses disposed closer to the image side than the aperture; and
one or more negative lenses disposed closer to an object side than the aperture; and
wherein a diffraction optical part is provided on the joint surface of a first cemented lens of the one or more cemented lenses, and the conditional expressions of $-0.1 < f/(\nu_{RN} \times f_{RN}) < -0.02$, $80 < \nu_{FN} < 97$, $|r_{avr}/r_{DOE}| < 3$, and $-0.02 P_{\Theta gF} - (-1.625 \times 10^{-3} \times \nu_{RP} + 0.642) < 0.03$ are satisfied in which
f represents the focal length of the whole system,
$\nu_{RN}$ and $f_{RN}$ represent the Abbe number of the material of a negative lens of a second cemented lens of the one or more cemented lenses, and the focal length of the negative lens of the second cemented lens of the one or more cemented lenses within the air, respectively,
$\nu_{FN}$ represents the maximum Abbe number, of the Abbe number of the material of a negative lens disposed closer to the object side than the aperture,
$r_{avr}$ represents the average value between the curvature radius of a face closest to the object side and the curvature radius of a face closest to the image side of the first cemented lens including the diffraction optical part,
$r_{DOE}$ represents the curvature radius of the diffraction optical part,
$P_{\Theta gF}$ represents the partial dispersion ratio of a positive lens having the maximum difference of a partial dispersion ratio as to a reference line of the material of a positive lens disposed closer to the image side than the aperture, and
$\nu_{RP}$ represents the Abbe number of the material of a positive lens having the maximum difference of a partial dispersion ratio as to a reference line of the material of a positive lens disposed closer to the image side than the aperture.

8. An image pickup optical system comprising:
a first lens unit having negative refractive power;
a second lens unit having positive refractive power and being disposed closer to an image side than the first lens unit; and
an aperture;
wherein the image pickup optical system performs zooming by changing the interval of the first lens unit and second lens unit;
wherein the image pickup optical system includes
one or more cemented lenses disposed closer to the image side than the aperture; and
one or more negative lenses disposed closer to an object side than the aperture; and
wherein a diffraction optical part is provided on the joint surface of a first cemented lens of the one or more cemented lenses, and the conditional expressions of $-0.1 < f_{ZW}/(\nu_{ZRN} \times f_{ZRN}) < -0.02$, $80 < \nu_{ZFN} < 97$, $|r_{Zavr}/r_{ZDOE}| < 3$, and $-0.02 P_{Z\Theta gF} - (-1.625 \times 10^{-3} \times \nu_{ZRP} + 0.642) < 0.03$ are satisfied in which
$f_{zw}$ represents the focal length of the whole system,
$\nu_{ZRN}$ and $f_{ZRN}$ represent the Abbe number of the material of a negative lens of a second cemented lens of the one or more cemented lenses, and the focal length of the negative lens of the second cemented lens of the one or more cemented lenses within the air, respectively,
νZFN represents the maximum Abbe number, of the Abbe number of the material of a negative lens disposed closer to the object side than the aperture,
$r_{Zavr}$ represents the average value between the curvature radius of a face closest to the object side and the curvature radius of a face closest to the image side of the first cemented lens including the diffraction optical part,
$r_{ZDOE}$ represents the curvature radius of the diffraction optical part,
$P_{Z\Theta gF}$ represents the partial dispersion ratio of a positive lens having the maximum difference of a partial dispersion ratio as to a reference line of the material of a positive lens disposed closer to the image side than the aperture, and
$\nu_{ZRP}$ represents the Abbe number of the material of a positive lens having the maximum difference of a partial dispersion ratio as to a reference line of the material of a positive lens disposed closer to the image side than the aperture.

9. The image pickup optical system according to claim 8, wherein the conditional expression of $40 < f_{ZDOE}/f_{ZW} < 200$ is satisfied in which
$f_{ZDOE}$ represents the focal length according to only the diffraction components of the diffraction optical part.

10. An image pickup apparatus comprising:
an image pickup optical system including,
a first lens unit having negative refractive power;
a second lens unit having positive refractive power and being disposed closer to an image side than the first lens unit; and
an aperture;
wherein the image pickup optical system performs zooming by changing the interval of the first lens unit and second lens unit;
wherein the image pickup optical system includes
one or more cemented lenses disposed closer to the image side than the aperture; and
one or more negative lenses disposed closer to an object side than the aperture; and
wherein a diffraction optical part is provided on the joint surface of a first cemented lens of the one or more cemented lenses, and the conditional expressions of $-0.1 < f_{ZW}/(\nu_{ZRN} \times f_{ZRN}) < -0.02,$ $80 < \nu_{ZFN} < 97,$ $|r_{Zavr}/r_{ZDOE}| < 3,$ and $-0.02 P_{Z\Theta gF} - (-1.625 \times 10^{-3} \times \nu_{ZRP} + 0.642) < 0.03$ are satisfied in which $f_{zw}$ represents the focal length of the whole system, $\nu_{ZRN}$ and $f_{ZRN}$ represent the Abbe number of the material of a negative lens of a second cemented lens of the one or more cemented lenses, and the focal length of the negative lens of the second cemented lens of the one or more cemented lenses within the air, respectively, $\nu_{ZFN}$ represents the maximum Abbe number, of the Abbe number of the material of a negative lens disposed closer to the object side than the aperture, $r_{Zavr}$ represents the average value between the curvature radius of a face closest to the object side and the curvature radius of a face closest to the image side of the first cemented lens including the diffraction optical part, $r_{ZDOE}$ represents the curvature radius of the diffraction optical part, $P_{Z\Theta gF}$ represents the partial dispersion ratio of a positive lens having the maximum difference of a partial dispersion ratio as to a reference line of the material of a positive lens disposed closer to the image side than the aperture, and vZRP represents the Abbe number of the material of a positive lens having the maximum difference of a partial dispersion ratio as to a reference line of the material of a positive lens disposed closer to the image side than the aperture.

* * * * *